US012750693B2

(12) United States Patent
Du et al.

(10) Patent No.: US 12,750,693 B2
(45) Date of Patent: Sep. 29, 2026

(54) METHOD AND APPARATUS FOR MEASURING STATE INFORMATION OF INTERMEDIATE OBJECT

(71) Applicant: HUAWEI TECHNOLOGIES CO., LTD., Shenzhen (CN)

(72) Inventors: Rui Du, Shenzhen (CN); Huangxun Chen, Hong Kong (CN); Yuchen Guo, Shenzhen (CN); Chenchen Liu, Shenzhen (CN); Meihong Zhang, Shenzhen (CN); Qian Zhang, Hong Kong (CN); Xiao Han, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 876 days.

(21) Appl. No.: 17/743,949

(22) Filed: May 13, 2022

(65) Prior Publication Data

US 2022/0279365 A1 Sep. 1, 2022

Related U.S. Application Data

(63) Continuation of application No. PCT/CN2020/128810, filed on Nov. 13, 2020.

(30) Foreign Application Priority Data

Nov. 14, 2019 (CN) .......................... 201911113775.9

(51) Int. Cl.
*H04W 24/02* (2009.01)
*H04B 17/309* (2015.01)

(52) U.S. Cl.
CPC .......... *H04W 24/02* (2013.01); *H04B 17/309* (2015.01)

(58) Field of Classification Search
CPC ............................. H04W 24/02; H04B 17/309
See application file for complete search history.

(56) References Cited

U.S. PATENT DOCUMENTS 11,510,184 B2 * 11/2022 Huang .................. H04L 5/0053
2010/0110994 A1 * 5/2010 Ratsuk ................... H04B 1/713
370/329

(Continued)

FOREIGN PATENT DOCUMENTS

CN 102421189 A 4/2012
CN 105071878 A 11/2015

(Continued)

OTHER PUBLICATIONS 802.11ah-2016—IEEE Standard for Information technology—Telecommunications and information exchange between systems—Local and metropolitan area networks—Specific requirements—Part 11: Wireless LAN Medium Access Control (MAC) and Physical Layer (PHY) Specifications Amendment 2: Sub 1 GHz License Exempt Operation, 594 pages.

(Continued)

*Primary Examiner* — Faruk Hamza
*Assistant Examiner* — Tito Q Pham
(74) *Attorney, Agent, or Firm* — Rimon PC

(57) ABSTRACT

A first device sends a first message to a second device, where the first message indicates to the second device to hop to different channels at different times to send radio signals. The frequency bandwidth ranges of any two channels do not completely overlap, and the frequency bandwidth range of each channel is within a total frequency bandwidth range supported by the first device. The first device separately receives the radio signals that are sent by the second device on different channels at different times. The radio signals reach the first device after being reflected by an intermediate object. The first device measures the state information of the (Continued)

intermediate object based on the physical characteristics of the different radio signals that are separately received.

20 Claims, 24 Drawing Sheets

(56) References Cited

U.S. PATENT DOCUMENTS

| | | | | |
|---|---|---|---|---|
| 2014/0321509 | A1* | 10/2014 | Webb | H04W 72/542 375/133 |
| 2016/0131750 | A1* | 5/2016 | Lu | G01S 11/06 342/458 |
| 2017/0164227 | A1* | 6/2017 | Zwirn | H04W 24/10 |
| 2018/0310341 | A1* | 10/2018 | Yerramalli | H04B 1/7156 |
| 2019/0020424 | A1* | 1/2019 | Yerramalli | H04B 17/309 |
| 2019/0339378 | A1* | 11/2019 | Zwirn | G01S 13/878 |

FOREIGN PATENT DOCUMENTS

| | | | |
|---|---|---|---|
| CN | 106231670 | A | 12/2016 |
| CN | 208314985 | U | 1/2019 |
| WO | 2009101459 | A1 | 8/2009 |

OTHER PUBLICATIONS

IEEE P802.11ax/D2.2, Feb. 2018, Draft Standard for Information technology—Telecommunications and information exchange between systems Local and metropolitan area networks—Specific requirements—Part 11: Wireless LAN Medium Access Control(MAC) and Physical Layer (PHY) Specifications, Amendment 6: Enhancements for High Efficiency WLAN, 620 pages.

P802.11-REVmd/D2.0, Dec. 2018—IEEE Draft Standard for Information Technology—Telecommunications and Information Exchange Between Systems Local and Metropolitan Area Networks—Specific Requirements—Part 11: Wireless LAN Medium Access Control (MAC) and Physical Layer (PHY) Specifications, 4601 pages.

* cited by examiner

METHOD AND APPARATUS FOR MEASURING STATE INFORMATION OF INTERMEDIATE OBJECT

CROSS-REFERENCE TO RELATED APPLICATIONS

This application is a continuation of International Patent Application No. PCT/CN2020/128810, filed on Nov. 13, 2020, which claims priority to Chinese Patent Application No. 201911113775.9, filed on Nov. 14, 2019. The disclosures of the aforementioned applications are hereby incorporated by reference in their entireties.

STATEMENT OF JOINT RESEARCH AGREEMENT

The subject matter and the claimed invention were made by or on the behalf of Hong Kong University of Science and Technology R and D Corporation Limited and Huawei Technologies Co., Ltd., of Shenzhen, Guangdong Province, P.R. China, under a joint research agreement titled "Research on intelligent sensing technology of wireless communication." The joint research agreement was in effect on or before the claimed invention was made, and that the claimed invention was made as a result of activities undertaken within the scope of the joint research agreement.

TECHNICAL FIELD

Embodiments of this application relate to the field of communication technologies, and in particular, to a method and an apparatus for measuring the state information of an intermediate object.

BACKGROUND

Currently, Wi-Fi technologies for wireless communication have been applied in every aspect of social productions, commercial activities, and daily lives. Large quantities of Wi-Fi devices are widely deployed. In addition to common routers, notebook computers, and smartphones, an increasing quantity of Internet of things devices are equipped with Wi-Fi chips.

A channel figuratively represents a path between a transmit end and a receive end in a wireless communication system. A channel has a specific frequency bandwidth, and the frequency bandwidth specifies the upper and lower frequencies of radio signals that can be transmitted through the channel.

When one device sends a radio signal to another device, if there is an intermediate object (for example, a person or a vehicle) between the two devices, a radio signal sent by one device reaches the other device after being reflected by the intermediate object. Consequently, the physical characteristics of the radio signal change after the radio signal reaches the other device. These physical characteristics may be, for example, a delay and a Doppler frequency shift. As shown in FIG. 1*a*, a station (STA) is a transmit end, a wireless access point (AP) is a receive end, and a radio signal sent by the STA reaches the AP after being reflected by a person. Based on this, the receive end can measure, by analyzing the physical characteristics of the received radio signal, state information of an intermediate object existing between the receive end and the transmit end. The state information of the intermediate object includes, for example, information such as the distance between the intermediate object and the radio signal transmit end and/or the radio signal receive end, the azimuth of the intermediate object relative to the transmit end and/or the receive end, and the moving speed of the intermediate object.

Currently, APs are devices supporting high-bandwidth transmission, for example, an AP is able to transmit a radio signal on a bandwidth of 80 MHz. However, STAs and most Internet of things devices do not support high-bandwidth transmission. For example, they support transmission of a radio signal only on a bandwidth of 20 MHz, but do not support transmission of a radio signal on a bandwidth of 40 MHz or 80 MHz. More accurate state information of an intermediate object can be measured at higher frequency bandwidth. Therefore, there is an urgent need to design a solution to effectively utilize the spatial diversity of the Internet of things devices, and avoid the limitations of the narrow bandwidth transmission capability of the Internet of things devices, in order to improve the accuracy of measuring state information of an intermediate object.

SUMMARY

Embodiments of this application provide a method and an apparatus for measuring the state information of an intermediate object, to provide a manner of accurately measuring the state information of an intermediate object.

According to a first aspect, a method for measuring state information of an intermediate object is provided, including: A first device may send a first message to a second device, where the first message may be used to indicate to the second device to hop to different channels at different times to send radio signals. Frequency bandwidth ranges of any two channels indicated by the first message do not completely overlap, and the frequency bandwidth range of each channel is within the total frequency bandwidth range supported by the first device. Then, the first device may receive the radio signals that are sent by the second device successively on the different channels at the different times. The radio signals sent by the second device reach the first device after being reflected by an intermediate object, where the intermediate object may be an obstacle or the like located between the first device and the second device. Further, the first device may measure the state information of the intermediate object based on the physical characteristics of the radio signals separately received on different channels. For example, the state information may be used to indicate the moving speed of the intermediate object. For another example, the state information may be further used to indicate the distance between the intermediate object and the first device and/or the second device. For another example, the state information may be further used to indicate the azimuth of the intermediate object relative to the first device and/or the second device. The state information may alternatively indicate several of the foregoing three. In addition, the intermediate object herein may be an object incapable of transmitting radio signals or an object capable of reflecting radio signals, for example, a vehicle, a person, or a building.

The first device indicates to the second device to hop to different channels at different times to send radio signals, so that the second device can transmit radio signals on at least two channels at different frequency bandwidths. Such radio signals occupy a wider frequency bandwidth than radio signals transmitted on one channel. Then, the first device can measure the state information of the intermediate object based on the physical characteristics of the radio signals transmitted on the wider frequency bandwidth, thereby improving measurement accuracy. In addition, the second device can be directed to perform at least two channel hoppings, through one message exchange with the first device. Compared with the conventional technology in which one message exchange can indicate only one channel hopping, channel negotiation time can also be reduced, thereby improving the efficiency of measuring the state information of the intermediate object.

In a possible implementation, the first device may further send a second message to a third device, where the second message may be used to indicate to the third device to hop to the different channels at different times to send radio signals. The plurality of channels to be hopped to as indicated by the second message may be the same as those indicated by the first message, but the second device and the third device hop to the same channel at different hopping times. Then, the first device may receive the radio signals that are sent by the third device successively on the different channels at the different times. The radio signals sent by the third device reach the first device after being reflected by the intermediate object. Further, the first device may measure the state information of the intermediate object based on the physical characteristics of the separately received radio signals that are sent by the second device on the different channels, and the physical characteristics of the separately received radio signals that are sent by the third device on the different channels.

The first device not only indicates to the second device to participate in the measurement task, but also indicates to the third device to participate in the measurement task. With the first device indicating a plurality of devices to participate in the measurement task and further consolidating the physical characteristics of the radio signals of the plurality of devices that participate in the measurement task, the accuracy of measuring the state information of the intermediate object can be further improved.

In a possible implementation, that the first device sends the first message to the second device and sends the second message to the third device may be that the first device sends a third message to the second device and the third device once, where the third message includes the first message and the second message.

When indicating to a plurality of devices to participate in the measurement task, the first device may notify, in one message, the plurality of devices to perform channel hopping, to reduce signaling interactions, allowing the measurement task to be executed as quickly as possible.

In a possible implementation, the first message may include identifiers of at least two channels and a channel hopping start time corresponding to the identifier of each channel, the identifiers of the plurality of channels are different from each other, and the plurality of channel hopping start times are different from each other.

The first device uses the identifiers of at least two channels to indicate different channels that the second device is to hop to, and uses the different channel hopping start times to indicate times for hopping. Therefore, an objective of indicating to the second device to hop to different channels at different times is implemented.

Similarly, the second message sent by the first device to the third device may also include identifiers of at least two channels and a channel hopping start time corresponding to the identifier of each channel. The identifiers of at least two channels included in the first message may be the same as those included in the second message, but an identifier of any channel in the first message and the same in the second message correspond to different channel hopping start times, to ensure that the second device and the third device hop to the same channel at different times.

In a possible implementation, the first message may include a channel hopping start time, a channel hopping time interval, and a channel hopping order, where the channel hopping order indicates hopping orders for at least two channels.

The first device uses the hopping order for at least two channels and the channel hopping time interval to indicate to the second device to hop to the different channels at the different times.

Similarly, the second message sent by the first device to the third device may also include a channel hopping start time, a channel hopping time interval, and a channel hopping order, where the channel hopping order indicates hopping orders for at least two channels. The channel hopping time interval and the channel hopping start time in the first message may be the same as those in the second message, but the channel hopping order in the first message is different from that in the second message, to ensure that the second device and the third device hop to the same channel at different times.

In a possible implementation, the first message may further include the quantity of channel hopping repetitions, where the quantity of channel hopping repetitions is used to indicate the quantity of executions that the channel hopping order is executed repeatedly by the second device.

The first device uses the quantity of channel hopping repetitions to indicate the quantity of executions that the channel hopping order is executed repeatedly by the second device. When the first device wants the second device to perform a plurality of channel hoppings, it is unnecessary to indicate a relatively large number of channel identifiers in the first message, thereby avoiding excessively long signaling caused by redundant information. This can also avoid a relatively large number of signaling interactions caused by sending signaling a plurality of times under a limited signaling length.

Similarly, the second message sent by the first device to the third device may also include the quantity of channel hopping repetitions, where the quantity of channel hopping repetitions is used to indicate the quantity of executions that the channel hopping order is executed repeatedly by the third device. The quantity of channel hopping repetitions in the first message may be the same as that in the second message.

In a possible implementation, the first message may further include a channel hopping repetition time interval, the channel hopping repetition time interval is used to indicate a time interval between an end time of executing the channel hopping order for the $n^{th}$ time by the second device and a start time of executing the channel hopping order for the $(n+1)^{th}$ time by the second device, and n is an integer greater than or equal to 1.

With the first device indicating the channel hopping repetition time interval to the second device, the second device is able to keep continuous track of the intermediate object and a plurality of signaling interactions with the second device are avoided.

Similarly, the second message sent by the first device to the third device may also include a channel hopping repetition time interval, the channel hopping repetition time interval is used to indicate a time interval between an end time of executing the channel hopping order for the $n^{th}$ time by the third device and a start time of executing the channel hopping order for the $(n+1)^{th}$ time by the third device, and n is an integer greater than or equal to 1. The channel hopping repetition time interval in the first message may be the same as that in the second message.

According to a second aspect, a method for measuring state information of an intermediate object is provided, including: A second device may receive a first message sent by a first device, where the first message may be used to indicate to the second device to hop to different channels at different times to send radio signals. Frequency bandwidth ranges of any two channels indicated by the first message do not completely overlap, and a frequency bandwidth range of each channel is within a total frequency bandwidth range supported by the first device. Then, the second device may hop to the different channels at the different times based on the first message to separately send radio signals to the first device. The radio signals sent by the second device reach the first device after being reflected by an intermediate object, where the intermediate object is located between the first device and the second device. The intermediate object may be an object incapable of transmitting radio signals but capable of reflecting radio signals, for example, a vehicle, a person, or a building.

Specific content of the first message in the second aspect used to indicate to the second device to perform channel hopping is the same as related descriptions of the first aspect, with the same technical effects achieved. The following introduces only specific content of the first message used to indicate to the second device to perform channel hopping. For technical effects brought by different content, refer to descriptions in possible implementations of the first aspect. Details are not repeated herein.

In a possible implementation, the first message may include a channel hopping start time, a channel hopping time interval, and a channel hopping order, where the channel hopping order indicates hopping orders for at least two channels.

In a possible implementation, the first message may further include identifiers of at least two channels and a channel hopping start time corresponding to the identifier of each channel, identifiers of the plurality of channels are different from each other, and a plurality of channel hopping start times are different from each other.

In a possible implementation, the first message may further include a channel hopping start time, a channel hopping time interval, and a channel hopping order, where the channel hopping order indicates hopping orders for at least two channels.

In a possible implementation, the first message may further include the quantity of channel hopping repetitions, where the quantity of channel hopping repetitions is used to indicate the quantity of executions that the channel hopping order is executed repeatedly by the second device.

In a possible implementation, the first message may further include a channel hopping repetition time interval, the channel hopping repetition time interval is used to indicate a time interval between an end time of executing the channel hopping order for the $n^{th}$ time by the second device and a start time of executing the channel hopping order for the $(n+1)^{th}$ time by the second device, and n is an integer greater than or equal to 1.

According to a third aspect, a method for measuring state information of an intermediate object is provided, including: A first device may send a first message to a second device, where the first message may be used to indicate to the second device to hop to different channels at different times to receive radio signals. Frequency bandwidth ranges of any two channels indicated by the first message do not completely overlap, and a frequency bandwidth range of each channel is within a total frequency bandwidth range indicated by the first device. Then, the first device may send radio signals to the second device on the different channels at the different times based on the indication of the first message. The radio signals sent by the first device reach the second device after being reflected by an intermediate object, where the intermediate object is located between the first device and the second device. Further, the first device may receive a plurality of groups of first physical characteristics fed back by the second device, where the plurality of groups of first physical characteristics are extracted by the second device from the radio signals that are sent by the first device and separately received on the different channels. Finally, the first device measures state information of the intermediate object based on the plurality of groups of first physical characteristics. For example, the state information may be used to indicate the moving speed of the intermediate object. For example, the state information may be used to indicate the distance between the intermediate object and the first device and/or the second device. For another example, the state information may be used to indicate the azimuth of the intermediate object relative to the first device and/or the second device. The state information may alternatively indicate several of the foregoing three. In addition, the intermediate object herein may be an object incapable of transmitting radio signals but capable of reflecting radio signals, for example, a vehicle, a person, or a building.

With the first device indicating to the second device to hop to different channels at different times to receive radio signals, the second device can transmit radio signals on at least two channels at different frequency bandwidths. Such radio signals occupy a wider frequency bandwidth than radio signals transmitted on one channel. Then, the first device can measure the state information of the intermediate object based on the physical characteristics of the radio signals transmitted on the wider frequency bandwidth, thereby improving measurement accuracy. In addition, the second device can be directed to perform at least two channel hoppings, through one message exchange with the first device. Compared with the conventional technology in which one message exchange can indicate only one channel hopping, channel negotiation time can also be reduced, thereby improving the efficiency of measuring the state information of the intermediate object.

In a possible implementation, the first device may further send a second message to a third device, where the second message may be used to indicate to the third device to hop to the different channels at different times to receive radio signals. The plurality of channels to be hopped to as indicated by the second message may be the same as those indicated by the first message, but the second device and the third device hop to the same channel at different hopping times. Then, the first device may send radio signals to the third device successively on the different channels at the different times based on the indication of the second message. The radio signals sent by the first device reach the third device after being reflected by the intermediate object. Further, the first device receives a plurality of groups of second physical characteristics fed back by the third device, where the plurality of groups of second physical characteristics are extracted by the third device from the radio signals that are sent by the first device and separately received on the different channels. Finally, the first device may measure the state information of the intermediate object based on the plurality of groups of first physical characteristics and the plurality of groups of second physical characteristics.

The first device not only indicates to the second device to participate in the measurement task, but also indicates to the third device to participate in the measurement task. With the first device indicating to a plurality of devices to participate in the measurement task and further consolidating the physical characteristics of the radio signals of the plurality of devices that participate in the measurement task, the accuracy of measuring the state information of the intermediate object can be further improved.

In a possible implementation, the first message may further include a physical characteristic feedback mode, and the feedback mode includes a feedback type and a type of measurement data, where the feedback type includes a timely feedback type and/or an aggregated feedback type, and the type of measurement data includes raw measurement data and processed measurement data. The timely feedback type is used to indicate to the second device to feed back to the first device a physical characteristic of a radio signal received on a current channel before hopping to a next channel; and the aggregated feedback type is used to indicate the second device to feed back to the first device physical characteristics of radio signals received on the plurality of channels after completing the channel hoppings based on the first message. In some embodiments, the aggregated feedback type is used to indicate the second device to feed back to the first device physical characteristics of radio signals received on the plurality of channels after completing all channel hoppings based on the first message. The raw measurement data is used to indicate to to the second device to feed back to the first device a raw physical characteristic of a radio signal received on a channel; and the processed measurement data is used to indicate to the second device to process a physical characteristic of a radio signal received on a channel and feed back the processed physical characteristic to the first device.

Similarly, the second message sent by the first device to the third device may also include a physical characteristic feedback mode for the third device. The physical characteristic feedback mode in the first message may be the same as that in the second message.

The method described in the third aspect differs that described in the first aspect as follows: In the first aspect, the second device and the third device send, based on indications of the first device, radio signals to the first device on different channels at different times. The first device receives the radio signals on corresponding channels at corresponding times, and measures state information of an intermediate object based on the physical characteristics of the received radio signals. In the third aspect, the second device and the third device receive, on different channels at different times based on indications of the first device, radio signals sent by the first device. The first device sends the radio signals on the corresponding channels at the corresponding times. The second device and the third device extract the physical characteristics of the radio signals received on the different channels at the different times, and feed back the physical characteristics to the first device. Therefore, the first device measures state information of an intermediate object based on the physical characteristics of the radio signals fed back by the second device. As described, technical details for indicating channel hopping in the first aspect are the same as those in the third aspect, and are not repeated herein.

According to a fourth aspect, a method for measuring state information of an intermediate object is provided, including: A second device may receive a first message sent by a first device, where the first message may be used to indicate to the second device to hop to different channels at different times to receive radio signals. Frequency bandwidth ranges of any two channels indicated by the first message do not completely overlap, and the frequency bandwidth range of each channel is within the total frequency bandwidth range supported by the first device. Then, the second device may hop successively to the different channels at the different times based on the first message to receive radio signals sent by the first device, where the radio signals sent by the first device reach the second device after being reflected by an intermediate object, and the intermediate object is located between the first device and the second device. Further, the second device extracts the physical characteristics of the received radio signals to obtain a plurality of groups of physical characteristics. The second device feeds back the plurality of groups of physical characteristics to the first device. The intermediate object may be an object incapable of transmitting radio signals but capable of reflecting radio signals, for example, a vehicle, a person, or a building.

With the first device indicating to the second device to hop to different channels at different times to receive radio signals, the second device can transmit radio signals on at least two channels at different frequency bandwidths, thereby increasing the frequency bandwidth for transmitting radio signals. Such radio signals occupy a wider frequency bandwidth than radio signals transmitted on one channel. Then, the first device can measure the state information of the intermediate object based on the physical characteristics of the radio signals transmitted on the wider frequency bandwidth, thereby improving measurement accuracy. In addition, the second device can be directed to perform at least two channel hoppings, through one message exchange with the first device. Compared with the conventional technology in which one message exchange can indicate only one channel hopping, channel negotiation time can also be reduced, thereby improving the efficiency of measuring the state information of the intermediate object.

In a possible implementation, the first message further includes a physical characteristic feedback mode. In this case, that the second device feeds back the plurality of groups of physical characteristics to the first device may be that the second device feeds back the plurality of groups of physical characteristics to the first device based on the physical characteristic feedback mode. The feedback mode includes a feedback type and a type of measurement data. The feedback type includes a timely feedback type and/or an aggregated feedback type, and the type of measurement data includes raw measurement data and processed measurement data. The timely feedback type is used to indicate to the second device to feed back to the first device a physical characteristic of a radio signal received on a current channel before hopping to a next channel; and the aggregated feedback type is used to indicate to the second device to feed back to the first device the physical characteristics of the radio signals received on the plurality of channels after completing the channel hoppings based on the first message. In some embodiments, the aggregated feedback type is used to indicate to the second device to feed back to the first device the physical characteristics of the radio signals received on the plurality of channels after completing all channel hoppings based on the first message. The raw measurement data is used to indicate to the second device to feed back to the first device a raw physical characteristic of a radio signal received on a channel; and the processed measurement data is used to indicate to the second device to process a physical characteristic of a radio signal received on a channel and feed back the processed physical characteristic to the first device.

Specific content of the first message in the fourth aspect used to indicate to the second device to perform channel hopping is the same as related descriptions of the first aspect, with the same technical effects achieved. Details are not repeated herein.

According to a fifth aspect, an apparatus for measuring state information of an intermediate object is provided. The apparatus has a function of implementing the first aspect or any possible implementation of the first aspect, or may have a function of implementing the third aspect or any possible implementation of the third aspect. The function may be implemented by hardware, or may be implemented by hardware executing corresponding software. The hardware or the software includes one or more function modules corresponding to the foregoing function.

According to a sixth aspect, an apparatus for measuring state information of an intermediate object is provided. The apparatus has a function of implementing the second aspect or any possible implementation of the second aspect, or may have a function of implementing the fourth aspect or any possible implementation of the fourth aspect. The function may be implemented by hardware, or may be implemented by hardware executing corresponding software. The hardware or the software includes one or more function modules corresponding to the foregoing function.

According to a seventh aspect, an apparatus for measuring state information of an intermediate object is provided. The apparatus may be the first device in the foregoing method embodiments, or a chip disposed in a first device. The apparatus includes a transceiver and a processor, and optionally, further includes a memory. The memory is configured to store a computer program or instructions. The processor is separately coupled to the memory and the transceiver. When the processor executes the computer program or instructions, the apparatus is enabled to execute, by using the transceiver, the method performed by a first device in the first aspect or any possible implementation of the first aspect, or the method performed by a first device in the third aspect or any possible implementation of the third aspect.

According to an eighth aspect, an apparatus for measuring state information of an intermediate object is provided. The apparatus may be a second device in the foregoing method embodiments, or a chip disposed in a second device. The apparatus includes a transceiver and a processor, and optionally, further includes a memory. The memory is configured to store a computer program or instructions. The processor is separately coupled to the memory and the transceiver, and when the processor executes the computer program or instructions, the apparatus is enabled to execute, by using the transceiver, the method performed by a second device in the second aspect or any possible implementation of the second aspect, or the method performed by a second device in the fourth aspect or any possible implementation of the fourth aspect.

According to a ninth aspect, a computer program product is provided. The computer program product includes computer program code. When the computer program code is run on a computer, the computer is enabled to perform the method performed by a first device in the first aspect or any possible implementation of the first aspect, or perform the method performed by a second device in the second aspect or any possible implementation of the second aspect, or perform the method performed by a first device in the third aspect or any possible implementation of the third aspect, or perform the method performed by a second device in the fourth aspect or any possible implementation of the fourth aspect.

According to a tenth aspect, this application provides a chip system. The chip system includes a processor and a memory. The processor and the memory are electrically coupled to each other. The memory is configured to store computer program instructions and the processor is configured to execute some or all of the computer program instructions in the memory. When the part or all of the computer program instructions is executed, the method performed by a first device in the first aspect or any possible implementation of the first aspect, or the method performed by a second device in the second aspect or any possible implementation of the second aspect, or the method performed by a first device in the third aspect or any possible implementation of the third aspect, or the method performed by a second device in the fourth aspect or any possible implementation of the fourth aspect is implemented.

In a possible design, the chip system may further include a transceiver, where the transceiver is configured to send a signal that is processed by the processor or receive a signal that is input to the processor. The chip system may include a chip, or may include a chip and another discrete device.

According to an eleventh aspect, a computer-readable storage medium is provided. The computer-readable storage medium stores a computer program. When the computer program is run, the method in the first aspect or any possible implementation of the first aspect is performed, or the method in the second aspect or any possible implementation of the second aspect is performed, or the method in the third aspect or any possible implementation of the third aspect is performed, or the method in the fourth aspect or any possible implementation of the fourth aspect is performed.

According to a twelfth aspect, a system for measuring state information of an intermediate object is provided. The system includes: a first device performing the method in the first aspect or any possible implementation of the first aspect, and a second device performing the method in the second aspect or any possible implementation of the second aspect.

According to a thirteenth aspect, a system for measuring state information of an intermediate object is provided. The system includes: a first device performing the method in the third aspect or any possible implementation of the third aspect, and a second device performing the method in the fourth aspect or any possible implementation of the fourth aspect.

DESCRIPTION OF EMBODIMENTS

The following describes in detail embodiments of this application with reference to accompanying drawings.

The technical solutions in embodiments of this application may be applied to various communication systems, for example, a long term evolution (LTE) system, a worldwide interoperability for microwave access (WiMAX) communication system, a 5th generation (5G) system, for example, new radio access technology (NR), and other future communication systems.

For ease of understanding of embodiments of this application, an application scenario of this application is described below. The service scenario described in embodiments of this application is intended to describe the technical solutions of embodiments of this application more clearly, and does not constitute any limitation on the technical solutions provided in embodiments of this application. It may be learned by a person of ordinary skill in the art that, with emergence of new service scenarios, the technical solutions provided in embodiments of this application also apply to similar technical problems.

Generally, wireless devices such as switches, air conditioners, and sockets are installed indoors at homes. One wireless device can send a radio signal to and receive a radio signal from another wireless device. When a user is indoors, a radio signal sent by a radio signal transmit end may reach a radio signal receive end after being reflected by the user's body. A physical characteristic of the radio signal may be extracted by the receive end, and a current state of the user may be measured by analyzing the extracted physical characteristic. For example, whether the user is moving and a moving speed are measured, or information such as the distance or the azimuth of the user to the signal transmit end or the signal receive end is measured. The measured state information can be used to predict that the user is about to perform an operation on an indoor device. Alternatively, in an outdoor environment, for example, state information of a vehicle or another intermediate object located between a transmit end and a receive end may be measured by using a physical characteristic of a radio signal transmitted between wireless devices.

Figure 1A:
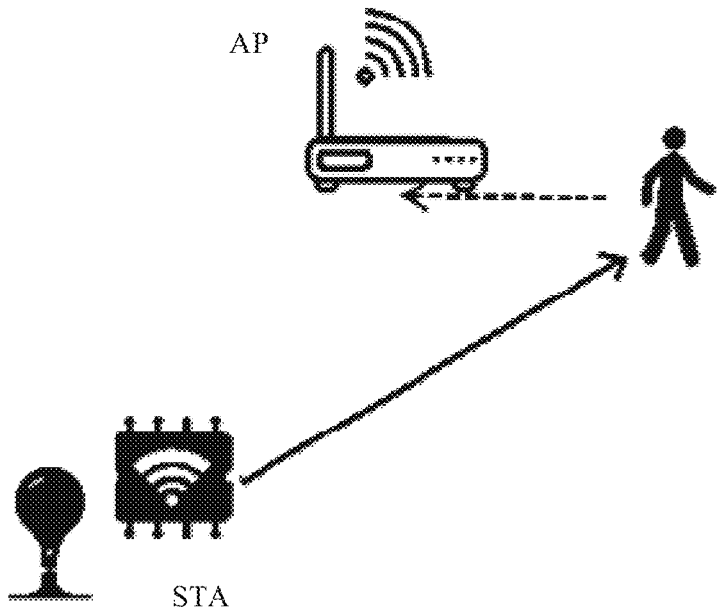
FIG. 1*a* and FIG. 1B are each a structural diagram of a communication system provided according to an embodiment of this application.
Figure 1B:
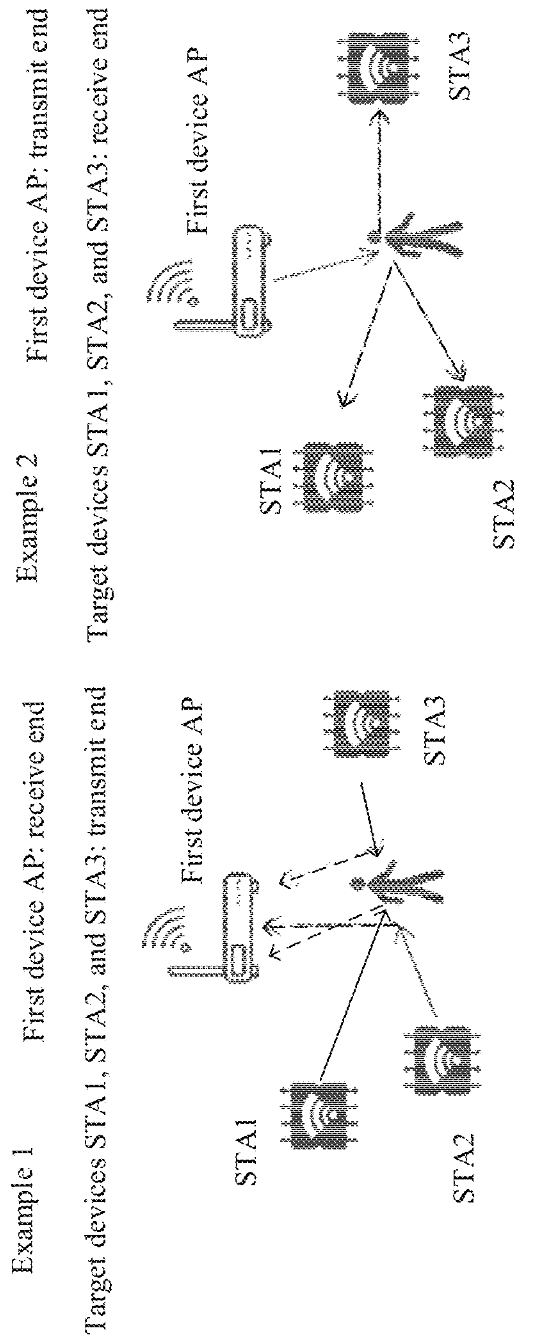

As shown in FIG. 1B, the communication system includes one first device (for example, an AP) and a plurality of target devices (for example, STAs). In the communication system, one communication manner (example 2) is as follows: The first device (for example, the AP) is a transmit end (which may also be referred to as an illuminator) of radio signals, and the target devices (for example, the STAs) are receive ends (which may also be referred to as measurers) of the radio signals. Another communication manner (example 1) is as follows: The target devices may alternatively be transmit ends (which may also be referred to as illuminators illuminator) of radio signals, and the first device is a receive end (which may also be referred to as a measurer) of the radio signals.

The first device is capable of transmission on a relatively wide bandwidth (for example, supporting 40 MHz or 80 MHz), and the first device may simultaneously send or receive radio signals on a plurality of channels, where a radio signal occupies a time period of a channel. The target device is capable of transmission on a relatively narrow bandwidth (for example, supporting only 20 MHz), and the target device can send or receive a radio signal only on one channel. The first device may transmit a radio signal to or receive a radio signal from the target device on a channel, and state information of an intermediate object located between the first device and the target device is measured by analyzing a physical characteristic of the radio signal. The first device may be a half-duplex device and the target device may also be a half-duplex device, incapable of simultaneously sending and receiving radio signals. Certainly, the first device and/or the target device may alternatively be a full-duplex device, capable of simultaneously sending and receiving radio signals. The intermediate object herein may be an object incapable of transmitting radio signals but capable of reflecting radio signals. The intermediate object may be a pedestrian, a vehicle, a building, or the like.

For ease of understanding embodiments of this application, the following describes some terms used in embodiments of this application, to facilitate understanding of a person skilled in the art.

(1) Bandwidth generally refers to a frequency bandwidth occupied by a radio signal. When used to describe a channel, bandwidth refers to a maximum frequency bandwidth of a radio signal that can effectively pass through the channel. For an analog signal, bandwidth is also known as frequency width and is measured in hertz (Hz).

(2) Target wakeup time (TWT): Target wakeup time is often used for Internet of things devices. An Internet of things device is normally sensitive to power consumption. Therefore, a target wakeup time mechanism is used to enable the device to operate in a specific period of time and sleep in the rest time, thereby achieving an effect of power saving.

(3) Subchannel selective transmission (SST): Subchannel selective transmission is often used in networks with narrowband transmission. In narrowband communication, a station sometimes needs to select a subchannel with best communication quality and hop to that channel for communication with an AP. A subchannel selective transmission mechanism can enable the station to implement this process under an indication of the AP.

The term "and/or" in this application describes an association relationship between associated objects and indicates that three relationships may exist. For example, A and/or B may indicate the following three cases: only A exists, both A and B exist, and only B exists. The character "/" usually indicates an "or" relationship between associated objects. "A plurality of" in this application means two or more.

In the descriptions of this application, terms such as "first" and "second" are merely used for distinction and description, and should not be understood as an indication or implication of relative importance, or as an indication or implication of an order. In addition, the term "for example" in embodiments of this application is used to represent an example, an illustration, or a description. Any embodiment or implementation solution described as an "example" in this application should not be construed as being more preferred or advantageous over another embodiment or implementation solution. Rather, the use of the term "for example" is intended to present a concept in a concrete manner.

Based on the description of the foregoing application scenario and the clarification and explanation of some basic concepts, a method and an apparatus for measuring state information of an intermediate object are provided in embodiments of this application. The method and the apparatus are based on the same technical idea, and because the method and the apparatus have similar problem solving principles, mutual reference may be made for implementations of the apparatus and the method, and repeated parts are not repeatedly described.

The following describes a process of measuring state information of an intermediate object by using an example in FIG. 1B in which the first device is a receive end (a measurer) and the target device is a transmit end (an illuminator).

First, the first device may determine at least one target device that is to participate in a state information measurement task of the intermediate object. For example, the AP determines which STAs are to participate in the measurement task. The AP may determine, based on a requirement of an upper-layer application or a running status of each STA, STAs to participate in the measurement task.

Next, a channel negotiation process is performed, which may be implemented by using a subchannel selective transmission (SST) process. Specifically, the first device may send a message to the target device that is to participate in the measurement task, where the message includes a channel identifier and a channel hopping start time. That channel identifier is used to indicate to the target device to send a radio signal on a channel of the identifier, and the channel hopping start time is used to indicate the target device to hop to the channel of the identifier at the channel hopping start time.

Then, a signal measurement process is performed, which means that the target device starts sending a radio signal after hopping to the channel of the identifier. In this case, the first device may receive, on the channel of the identifier at the channel hopping start time, the radio signal sent by the target device.

Finally, the first device analyzes a physical characteristic of the radio signal, and measures state information of the intermediate object. The physical characteristic of the radio signal may be, for example, a value of a subcarrier at a sampling point, or a time of flight (ToF), a Doppler, or an angle of arrival (AoA) obtained by processing a value of a subcarrier at a sampling point, where the time of flight is used for calculating a distance, the Doppler is used for calculating a moving speed, and the angle of arrival is used for calculating an azimuth.

The subchannel selective transmission (SST) process described above may be implemented by "trigger frame based TWT negotiation" as specified in an existing protocol. The trigger frame structure may include a frame structure shown in FIG. 3*a*. To be specific, a message sent by the first device to the target device during the channel negotiation process includes the frame structure shown in FIG. 3*a*. The frame structure includes an element ID, a length, control information, and TWT parameter information. The "TWT parameter information" field is further divided into a plurality of fields. For example, a TWT channel may carry a channel identifier, and a Target Wakeup Time indicates a time point, where the time point may be understood as a channel hopping start time. For a purpose of each field in the frame structure shown in FIG. 3*a*, refer to chapter 9.4.2.199 TWT element in the standard document "IEEE P802.11-REVmd/D2.0, December 2018". Details are not described herein. During the channel negotiation process, the message sent by the first device to the target device includes that channel identifier, and the channel hopping start time is carried in the TWT parameter information field.

Figure 3A:
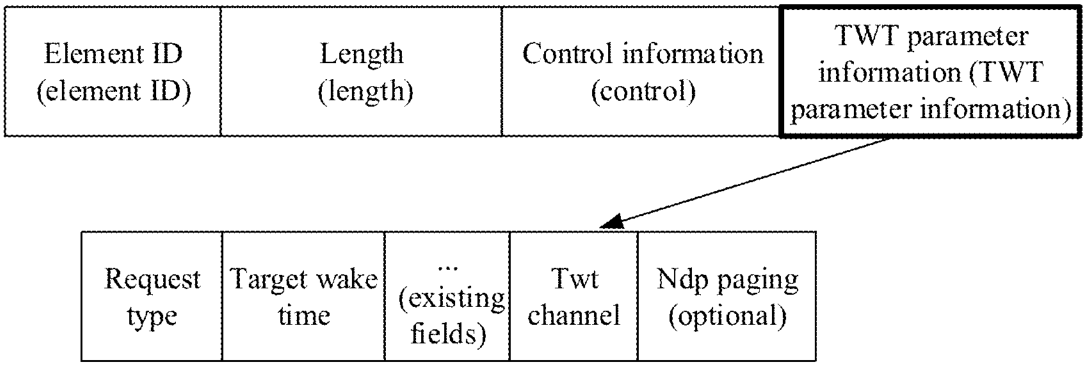
FIG. 3*a*, FIG. 3*b*, FIG. 3*c*, FIG. 3*d*, FIG. 3*e*, FIG. 8*a*, FIG. 8*b*, FIG. 12*a*, FIG. 12*b*, and FIG. 13 each show a frame structure according to an embodiment of this application.

Because the frame structure shown in FIG. 3*a* carries an identifier of only one channel, during the channel negotiation process, the first device sends a message to the target device once, and the target device is able to perform only one channel hopping. Therefore, the state information of the intermediate object can be measured based on a physical characteristic of a radio signal on only one channel. A bandwidth of one channel is relatively narrow, and measurement on the narrow bandwidth may cause an inaccurate measurement result. To achieve more accurate measurement, the first device may indicate to the target device to hop on a plurality of channels, and send a radio signal on each channel. The first device may consolidate the physical characteristics of the radio signals sent by the target device on the plurality of channels, to improve accuracy of measuring the state information of the intermediate object.

Figure 2:
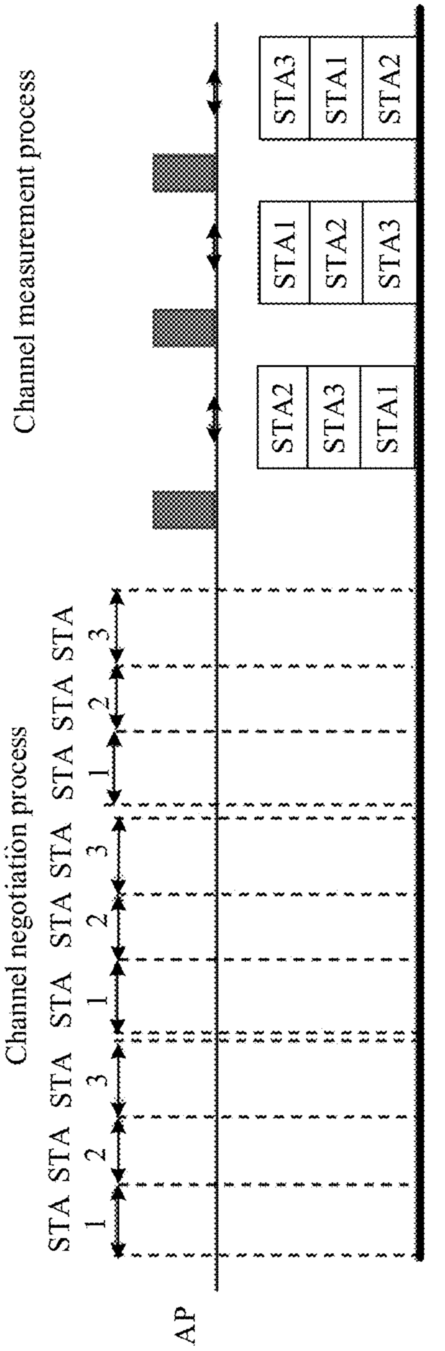
FIG. 2, FIG. 7*a*, FIG. 7*b*, and FIG. 11 each show an apparatus for measuring state information of an intermediate object according to an embodiment of this application.

As shown in FIG. 2, a manner of measuring state information of an intermediate object is provided, where an AP serves as a measurer, and STAs serve as illuminators. The AP configures three stations (STA 1, STA 2, and STA 3) to participate in a measurement task. During a channel negotiation process, the AP separately sends three messages to each of the three STAs, to indicate to each STA to separately perform three channel hoppings. Each message includes an identifier of one channel and a corresponding channel hopping start time. In this case, during a signal measurement process, each STA may hop to a channel of a corresponding identifier at the corresponding channel hopping start time, and send a radio signal, so that the AP receives the radio signal on the channel of the corresponding identifier. The STA 1 is used as an example. The AP sends three messages to the STA 1 to indicate to the STA 1 to send radio signals on three different channels. The AP may consolidate the physical characteristics of the received radio signals sent by the STA 1 on the three different channels, to more accurately measure the state information of an intermediate object located between the AP and the STA 1. Further, the AP may further consolidate consolidation results of the three STAs, to further accurately measure the state information of the intermediate object.

However, the AP needs to notify the STAs for each channel hopping, and each STA is separately notified. Therefore, a plurality of message exchanges are performed between the AP and the STAs, resulting in a long channel negotiation process, so that the measurement task is delayed.

The following uses a second device as an example to describe how a first device indicates to the second device to perform a plurality of channel hoppings in one message exchange with the second device. The second device is any one of the foregoing described target devices. It is assumed that a plurality of target devices are to participate in a measurement task, which may be respectively referred to as a second device, a third device, a fourth device, and so on.

Figure 4:
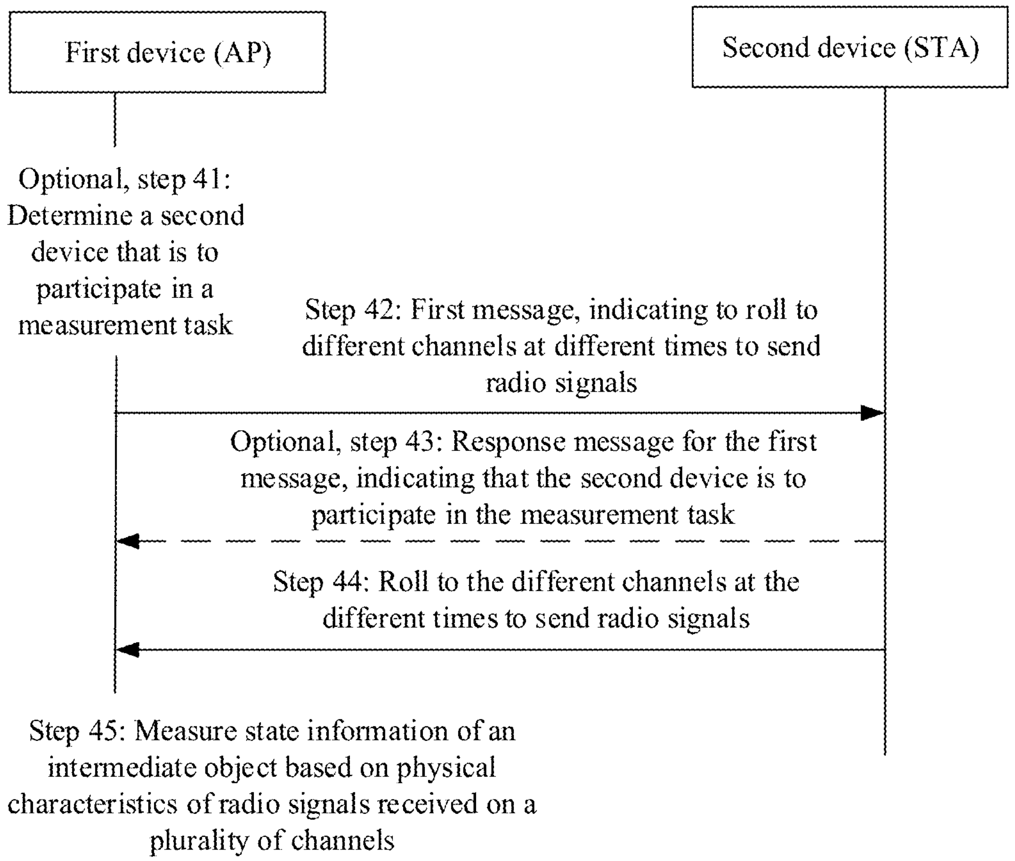
FIG. 4, FIG. 5, FIG. 6, FIG. 9, FIG. 10, and FIG. 14 each show a communication manner according to an embodiment of this application.

As shown in FIG. 4, a communication procedure for measuring state information of an intermediate object provided in this application includes the following steps.

Step 41: A first device determines a second device that is to participate in a measurement task.

Step 42: The first device sends a first message to the second device, and correspondingly, the second device receives the first message sent by the first device. The first message is used to indicate to the second device to hop to different channels at different times to send radio signals.

For example, the first device indicates to the second device to hop to channel 1 at 10:00 to send a radio signal, and hop to channel 2 at 10:01 to send a radio signal.

Frequency bandwidth ranges of any two channels indicated by the first message do not completely overlap, and a frequency bandwidth range of each channel is within a total frequency bandwidth range supported by the first device.

For example, the second device supports only a transmission capability of 20 MHz, and the first device supports a transmission capability in a bandwidth range of 0 to 80 MHz. A frequency bandwidth range of channel 1 may be 0 to 20 MHz, and a frequency bandwidth range of channel 2 may be 20 MHz to 40 MHz. Alternatively, a frequency bandwidth range of channel 1 may be 0 to 20 MHz, and a frequency bandwidth range of channel 2 may be 15 MHz to 35 MHz.

Generally, before the first device indicates to the second device to perform a channel hopping, the second device is on a primary channel. Certainly, the second device may alternatively be on a secondary channel. Before sending the first message to the second device, the first device may first determine a channel on which the second device is currently located, and send the first message to the second device on the corresponding channel.

To measure the state information of an intermediate object more accurately, after receiving the first message sent by the first device, the second device may determine, based on a status of the second device, whether to participate in the measurement task. Optionally, if the second device determines to participate in the measurement task, step 43 is performed: The second device sends to the first device a response message for the first message, where the response message is used to indicate that the second device agrees to participate in the measurement task.

If the first device receives no response message sent by the second device, the second device may be deemed not to agree to participate in the measurement task, and the first device may coordinate another target device to participate in the measurement task.

Certainly, when the second device is not to participate in the measurement task, the second device may also return a response message to the first device, to indicate that the second device is not to participate in the measurement task.

Step 44: The second device hops to the different channels at the different times based on the first message to separately send radio signals to the first device. Correspondingly, the first device separately receives the radio signals that are sent by the second device successively on the different channels at the different times.

The radio signals sent by the second device reach the first device after being reflected by an intermediate object located between the first device and the second device.

For example, based on the indication of the first message, the second device hops to channel 1 at 10:00 and sends a radio signal to the first device on channel 1. At 10:01, the second device makes another hopping to channel 2, and sends a radio signal to the first device on channel 2.

Step 45: The first device measures state information of the intermediate object based on the physical characteristics of the different radio signals that are separately received.

For example, the state information may be used to indicate the moving speed of the intermediate object. For example, the state information may be used to indicate the distance between the intermediate object and the first device and/or the second device. For another example, the state information is used to indicate the azimuth of the intermediate object relative to the first device and/or the second device. The state information may alternatively indicate several of the foregoing three.

An example process of measuring state information of an intermediate object based on physical characteristics of radio signals is briefly described below.

The second device hops to a plurality of channels to send radio signals, and the first device receives, on the plurality of channels, the radio signals sent by the second device. For any channel, the first device may extract channel state information (value) of each subcarrier from a preamble sequence of a radio signal sent by the second device. If the second device and the first device are multiple-antenna devices, channel state information of each subcarrier in each Wi-Fi packet (sample) may be extracted for each transmit-receive antenna pair (Tx-Rx pair).

After the first device performs the foregoing processing on the radio signals received on the plurality of channels, the first device may splice (bandwidth splicing), in frequency domain, the subcarrier channel state information obtained for each channel in frequency order, or may arrange the subcarrier channel state information obtained for each channel in a time domain direction based on collection times. Further, the first device may perform inverse Fourier transform in a frequency direction on the spliced subcarrier information, to obtain a high-resolution time of flight (ToF), and high-resolution distance information may be obtained by multiplying the time of flight by the speed of light. Fourier transform is performed in the time domain direction on the subcarrier channel state information to obtain Doppler information, and the Doppler information can be used for calculating a moving speed of an object. For a device with multiple antennas, the classical MUSIC (multiple signal classification) algorithm can also be used to calculate an angle of arrival AOA. Then, the first device may calculate the moving speed of the intermediate object, the distance between the intermediate object and the first device or the second device, and the like based on the information obtained through calculation such as the ToF, the Doppler information, and the angle of arrival (AoA).

Optionally, the second device may further hop back to the primary channel of the second device after completing the channel hoppings and sending the radio signals based on the indication in the first message.

Optionally, after receiving the radio signals sent by the second device, the first device may return an acknowledgment message ACK to the second device, indicating that the radio signals sent by the second device are received.

Through the foregoing process, the first device indicates to the second device to hop to different channels at different times to send radio signals. The second device transmits radio signals on at least two channels. Such radio signals occupy a wider frequency bandwidth than radio signals transmitted on one channel in the conventional technology, and therefore a frequency bandwidth for transmitting radio signals can be well improved. Then, the first device can measure the state information of the intermediate object based on the physical characteristics of the radio signals transmitted on the wider frequency bandwidth, thereby improving measurement accuracy. In addition, the second device is directed to perform at least two channel hoppings, through one message exchange with the first device, to reduce channel negotiation time, implementing timely measurement.

If the first device determines that a plurality of target devices are to participate in the measurement task, including a third device, a fourth device, and so on in addition to the second device, the first device may further notify, in a manner similar to the foregoing, the plurality of devices such as the third device and the fourth device to participate in the measurement task.

An example in which the first device synchronously indicates to a third device to participate in the measurement task is used below for detailed description.

First, the first device sends a second message to the third device, and correspondingly, the third device receives the second message sent by the first device. The second message is used to indicate to the third device to hop to different channels at different times to send radio signals.

Generally, the first device would not indicate to two different devices to send radio signals on the same channel at one moment. If two devices send radio signals on one channel at one moment, channel contention occurs between the two devices, and one device may fail to send a radio signal. However, the first device may indicate that there are two different devices sending radio signals on different channels at one moment. In all, the channels indicated in the first message may be the same as those indicated in the second message, but the second device and the third device hop to the same channel at different times.

For example, the first device indicates to the second device to hop to channel 1 at 10:00 to send a radio signal, and hop to channel 2 at 10:01 to send a radio signal. The first device may indicate to the third device to hop to channel 1 at 10:01 to send a radio signal, and hop to channel 2 at 10:00 to send a radio signal.

This is also true if still more devices, for example, a fourth device, participate in the measurement task. The devices participating in the measurement task may hop to the same channels indicated by the first device, but the devices may hop to the same channel at different times.

Then, the third device hops to the different channels at the different times based on the second message to separately send radio signals to the first device. Correspondingly, the first device separately receives the radio signals that are sent by the third device successively on the different channels at the different times. The radio signals sent by the third device reach the first device after being reflected by the intermediate object. If further more devices participate in the measurement task, the intermediate object herein is located between the first device and the devices participating in the measurement task.

Finally, the first device measures the state information of the intermediate object based on the physical characteristics of the separately received radio signals that are sent by the second device successively on the different channels at the different times, and the physical characteristics of the separately received radio signals that are sent by the third device successively on the different channels at the different times.

The first device not only indicates to the second device to participate in the measurement task, but may also indicate to the third device to participate in the measurement task. With the first device indicating to a plurality of devices to participate in the measurement task and further consolidating the physical characteristics of the radio signals of the plurality of devices that participate in the measurement task, measurement accuracy can be further improved.

If further more devices participate in the measurement task, the first device measures the state information of the intermediate object based on the physical characteristics of the separately received radio signals that are sent by the more devices on the different channels.

The operations performed by the third device or another device participating in the measurement task differ from those performed by the second device only in the channel hopping order. Other details are the same and are not repeated in this embodiment.

When indicating to a plurality of devices to participate in the measurement task, the first device may notify, in one message, the plurality of devices to perform channel hoppings, to reduce signaling interactions, allowing the measurement task to be executed as quickly as possible. For example, that the first device sends the first message to the second device and sends the second message to the third device may be that the first device sends a third message to the second device and the third device once, where the third message includes the first message and the second message.

The following describes, by using an embodiment, content of a message for indicating channel hoppings.

Figure 5:
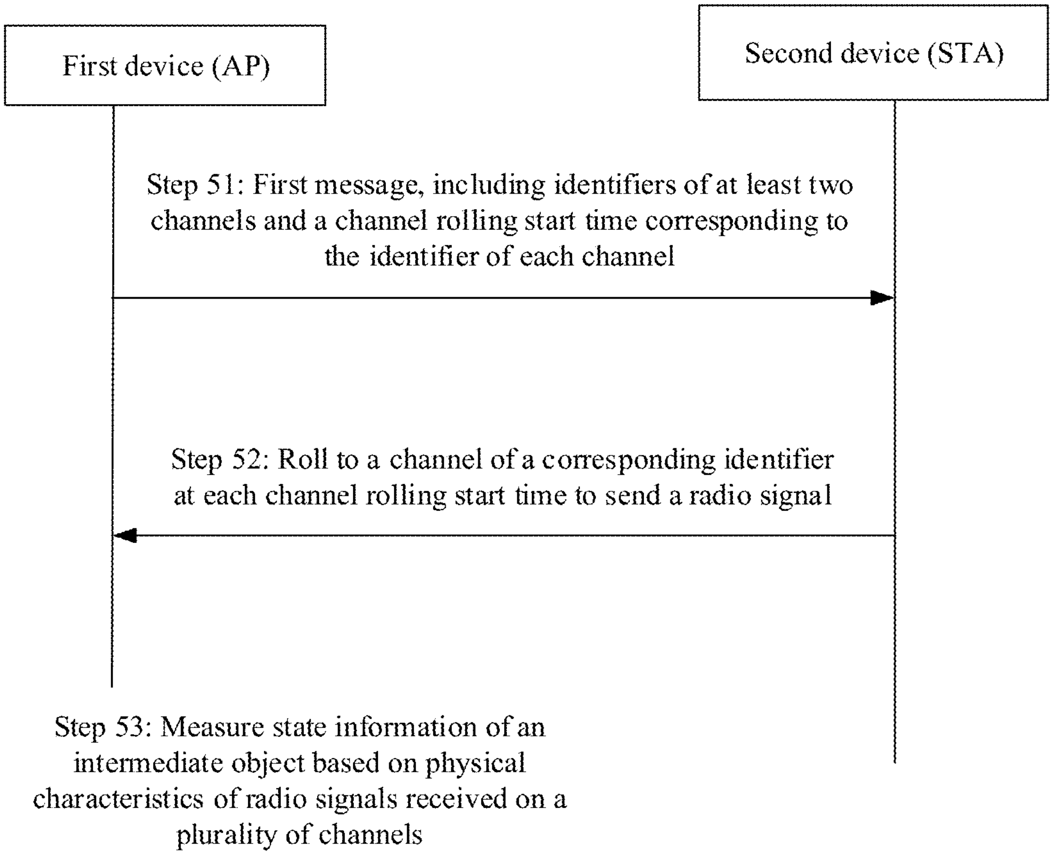

FIG. 5 is an embodiment of channel hoppings provided according to this application. A first message sent by a first device to a second device is used as an example to describe a process in which the first device indicates to the second device to perform a plurality of channel hoppings in one message exchange with the second device.

Step 51: A first device sends a first message to a second device, and correspondingly, the second device receives the first message sent by the first device, where the first message includes identifiers of at least two channels and a channel hopping start time corresponding to the identifier of each channel. Identifiers of the plurality of channels are different from each other, and a plurality of channel hopping start times are different from each other.

The first device uses the identifiers of at least two channels to indicate different channels that the second device is to hop to, and uses the different channel hopping start times to indicate times for hopping. Therefore, an objective of indicating to the second device to hop to different channels at different times is implemented.

For example, in the first message, an identifier of one channel is channel 1, which corresponds to a channel hopping start time 10:00; and an identifier of another channel is channel 2, which corresponds to a channel hopping start time 10:01. This means that the second device is directed to hop to channel 1 at 10:00 to send a radio signal, and hop to channel 2 at 10:01 to send a radio signal.

Similarly, a second message sent by the first device to a third device may also include identifiers of at least two channels and a channel hopping start time corresponding to the identifier of each channel. The identifiers of at least two channels included in the first message may be the same as those included in the second message, but an identifier of any channel in the first message and the same in the second message correspond to different channel hopping start times, to ensure that the second device and the third device hop to the same channel at different times. For example, in the second message, an identifier of one channel is channel 1, which corresponds to a channel hopping start time 10:01, and an identifier of another channel is channel 2, which corresponds to a channel hopping start time 10:00. This means that the second device is directed to hop to channel 1 at 10:01 to send a radio signal, and hop to channel 2 at 10:00 to send a radio signal. In this way, the second device and the third device are directed to hop to different channels to send signals at different times, to successfully preempt a channel and avoid mutual interference between the devices in sending signals.

Content of a message sent by the second device to another device participating in the measurement task is similar to that of the foregoing first message and the second message, provided that channel hopping start times corresponding to the same channel in a plurality of messages are different from each other.

Step 52: The second device hops to a channel of a corresponding identifier at each channel hopping start time, and sends a radio signal. Correspondingly, the first device receives, at each channel hopping start time, the radio signal sent by the second device on the channel of the corresponding identifier.

Optionally, the second device may further hop back to a primary channel of the second device after completing the channel hoppings and sending the radio signals based on the channel hopping indication in the first message. The second device itself may estimate a duration of staying on the last channel, for example, estimating the duration of staying on the last channel based on channel hopping start times in a plurality of channel hopping indications. That is, the duration of staying on the last channel is determined by referencing durations of staying on other channels. In general, durations of staying on all channels are substantially equal.

Step 53: The first device measures state information of the intermediate object based on the physical characteristics of the different radio signals that are separately received.

Step 53 is the same as step 45.

Because the identifiers of at least two channels included in the first message sent by the first device to the second device are different from each other, the identifier of each channel corresponds to a different channel hopping start time. In this way, the second device is directed to perform at least two channel hoppings, through one message exchange with the first device, to reduce channel negotiation time, implementing timely measurement.

Figure 3B:
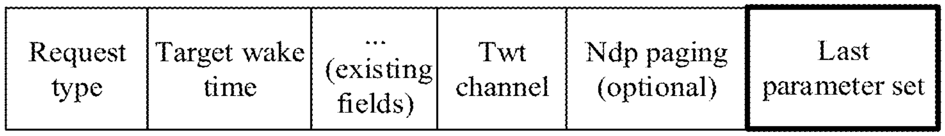
Figure 3C:
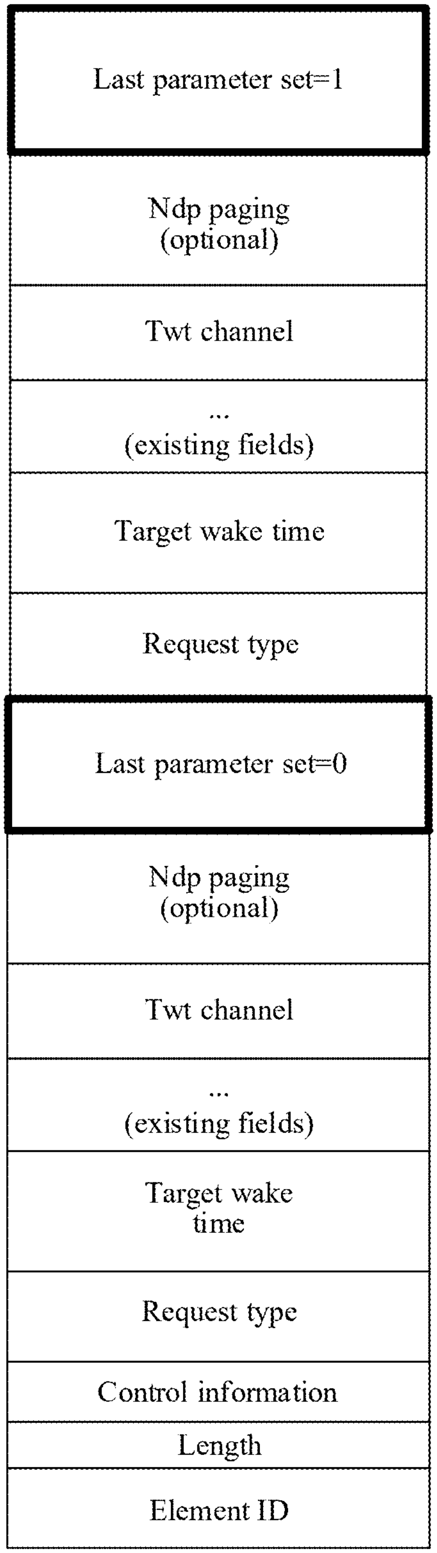

As shown in FIG. 3*b* and FIG. 3*c*, a frame structure included in a message (for example, a first message or a second message) for indicating channel hoppings is described. A field may be added at the end of a TWT parameter information "TWT parameter information" field shown in FIG. 3*a* to indicate whether a parameter set is also present thereafter. For example, the added field with a value 0 indicates that a parameter set is present and the added field with a value 1 indicates that no parameter set is present. Certainly, it may alternatively be that the added field with a value 1 indicates that a parameter set is present and that the added value with a value 0 indicates that no parameter set is present.

The addition of the field may be considered as improvement to the existing "TWT parameter information" field. The improved "TWT parameter information" field includes a field used to indicate whether a parameter set is further present thereafter.

For example, the added field may be defined as a last parameter set.

Because one "TWT parameter information" field can carry an identifier of one channel and a corresponding channel hopping start time, in order to indicate a plurality of channel hoppings in one message exchange, the first message may include identifiers of at least two channels and respective corresponding channel hopping start times, which can be distinguished by the added "Last parameter set" field. As shown in FIG. 3*c*, an example of a frame structure that carries identifiers of two channels and respective corresponding channel hopping start times is provided. In other words, the frame structure includes two "TWT parameter information" fields. In the "TWT parameter information" fields, a "TWT channel" field may carry an identifier of a channel, and a "Target Wakeup Time" field carries a channel hopping start time.

To further reduce exchanges, the first device may alternatively send, in one message, a message to a plurality of devices that participate in the measurement task. The message includes identifiers of the plurality of devices that participate in the measurement task. The identifiers of the plurality of devices that participate in the measurement task and a "TWT parameter information" field corresponding to each device may be carried in a control information control field shown in FIG. 3*c*.

Figure 3D:
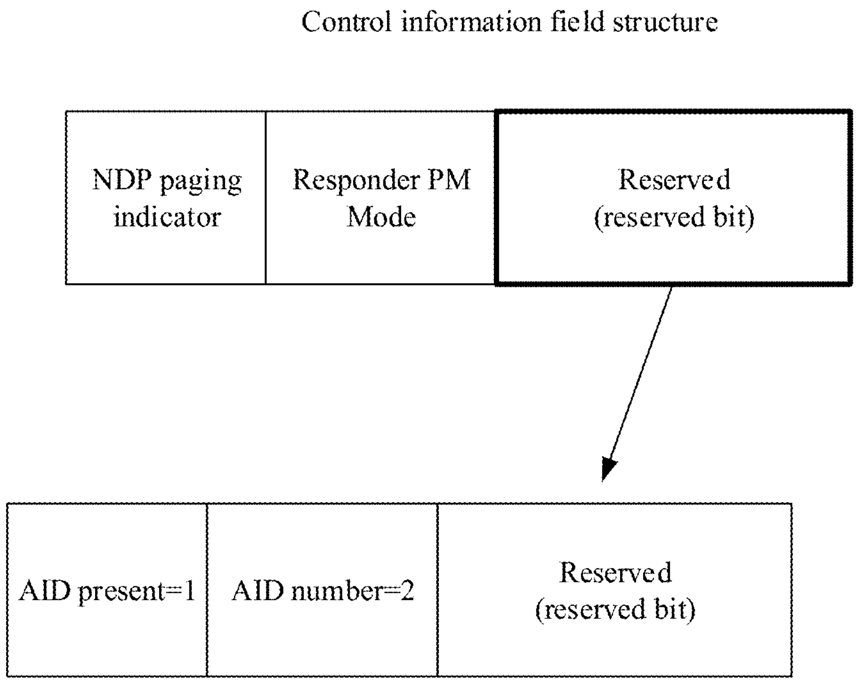

Referring to FIG. 3*d*, a structure of a control information field is shown therein. The original meanings of NDP paging indicator and Responder PM Mode remain unchanged as defined in FIG. 9-680 in the standard document "IEEE P802.11-REVmd/D2.0, December 2018". Originally, Reserved (reserved bits) may be used to indicate the quantity of second devices. For example, 6 bits are Reserved (reserved bits) in total, where some of the bits may be used to indicate whether a plurality of devices are included, some other bits indicate the quantity of devices, and the remaining bits are used as reserved bits. For example, one bit is used to indicate whether a plurality of devices are included. When that bit takes a value of 1, it indicates that a plurality of devices are included. An identifier of a device may be carried in an association identifier AID.

Figure 3E:
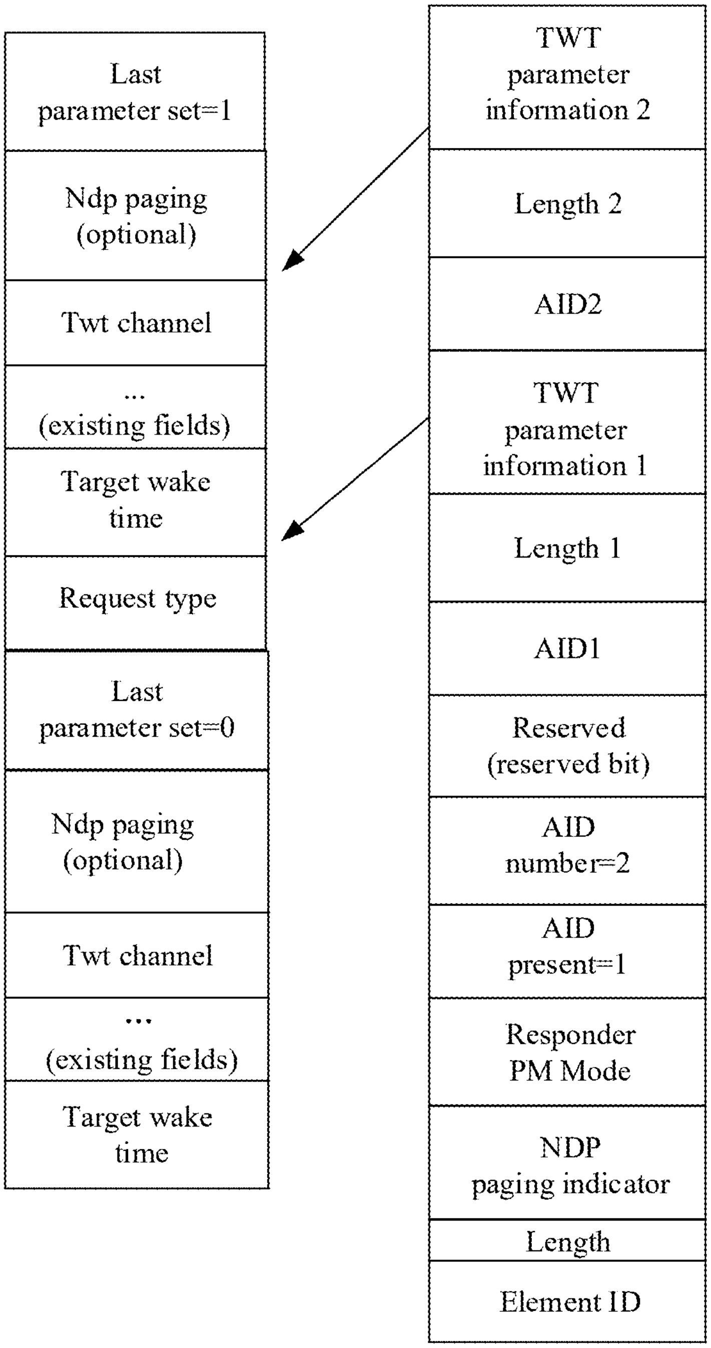

For example, the first device indicates to two devices to perform channel hoppings, and each device performs two channel hoppings. A message sent by the first device to the two devices may include a frame structure shown in FIG. 3*e*. AID 1 and AID 2 are identifiers of the devices. Length 1 indicates the quantity of bytes occupied by the TWT parameter information 1 field, where the TWT parameter information 1 field is associated with AID 1, and the TWT parameter information 1 field includes channel hopping information of the device corresponding to AID 1. The TWT parameter information 1 field includes two fields shown in FIG. 3*b*, which are used to indicate two channels to which the device corresponding to AID 1 hops, and respective corresponding channel hopping start times. Similarly, Length 2 indicates the quantity of bytes occupied by the TWT parameter information 2, where the TWT parameter information 2 field is associated with AID 2, and the TWT parameter information 2 field includes channel hopping information of the device corresponding to AID 2. The TWT parameter information 1 field includes two fields shown in FIG. 3*b*, which are used to indicate the two channels to which the device corresponding to AID 2 hops, and respective corresponding channel hopping start times.

The foregoing describes a solution in which a device participating in a measurement task is directed to perform at least two channel hoppings by having identifiers of at least two channels and respective corresponding channel hopping start times carried in a message (for example, a first message or a second message) for indicating channel hoppings. Next, referring to FIG. 6, another embodiment of channel hoppings provided in this application is further described. Still, a first message sent by a first device to a second device is used as an example. An objective of indicating, in one message exchange, to the second device to perform a plurality of channel hoppings is also implemented. The communication procedure shown in FIG. 5 differs from that shown in FIG. 6 mainly in the message content for indicating channel hoppings. In other words, specific content included in the first message is different, and the rest parts are the same. Repeated parts are not described again.

Step 61: A first device sends a first message to a second device, and correspondingly, the second device receives the first message sent by the first device. The first message includes a channel hopping start time, a channel hopping time interval, and a channel hopping order, where the channel hopping order indicates hopping orders for at least two channels.

Similarly, a second message sent by the first device to a third device may also include a channel hopping start time, a channel hopping time interval, and a channel hopping order, where the channel hopping order indicates hopping orders for at least two channels. The channel hopping time interval and the channel hopping start time in the first message are the same as those in the second message. However, the channel hopping order in the first message is different from that in the second message. This ensures that the second device and the third device hop to the same channel at different times.

Content of a message sent by the first device to another device participating in the measurement task is similar to that of the foregoing first message and the second message, provided that channel hopping orders in a plurality of messages are different from each other.

Step 62: After receiving the first message sent by the first device, the second device may determine, based on the channel hopping start time, the channel hopping time interval, and the channel hopping order in the first message, a channel hopping start time corresponding to each channel, and then hop to a corresponding channel at each channel hopping start time to send a radio signal. Correspondingly, the first device may also receive, on the corresponding channel at the corresponding channel hopping start time, the radio signal sent by the second device.

Step 63: The first device measures state information of the intermediate object based on the physical characteristics of the different radio signals that are separately received.

Step 63 is the same as step 53 and step 45.

Because the channel hopping order included in the first message sent by the first device to the second device is a hopping order for at least two channels, the second device can be directed to perform at least two channel hoppings, through one message exchange with the first device, to reduce channel negotiation time, implementing timely measurement.

Figure 7A:
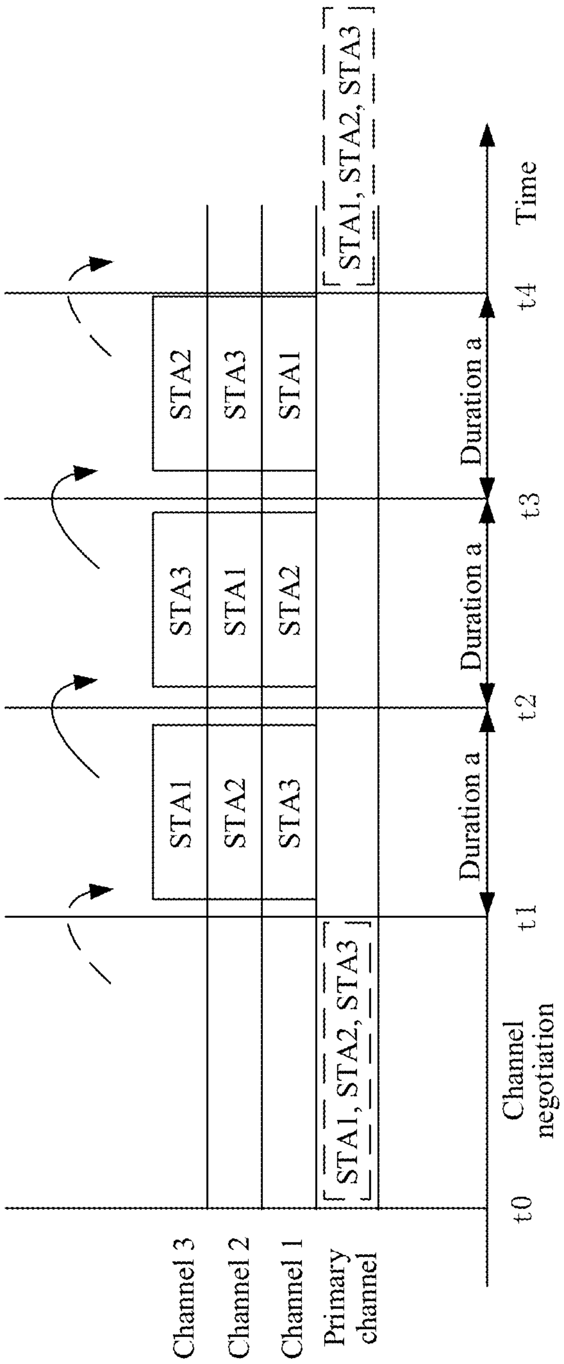

As shown in FIG. 7*a*, a process in which an AP communicates with a STA 1, a STA 2, and a STA 3 is provided.

The AP starts to perform channel negotiation with the three STAs at time to. Optionally, the three STAs are located on a primary channel at that time. During the channel negotiation process, messages sent by the AP to the three STAs include a channel hopping start time which is t1, and a channel hopping time interval which is duration a. A channel hopping order sent by the AP to the STA 1 is channel 3, channel 2, and channel 1; a channel hopping order sent by the AP to the STA 2 is channel 2, channel 1, and channel 3; and a channel hopping order sent by the AP to the STA 3 is channel 1, channel 3, and channel 2. One of the channel 1, channel 2, and channel 3 may be the primary channel, or the three channels may be secondary channels.

The STA 1 may determine, based on time t1 and duration a, that a plurality of channel hopping start times are respectively t1, t2, and t3 (where t2=t1+a and t3=t1+2a), and with reference to the channel hopping order, determine that the STA 1 hops to channel 3 at time t1 to send a radio signal, hops to channel 2 at time t2 to send a radio signal, and hops to channel 1 at time t3 to send a radio signal. The STA 1 may keep staying on channel 1, or may stay on channel 1 for duration a and hop back to the primary channel at time t4. Similarly, the AP may receive on channel 3, in a time period from t1 to t2, the radio signal sent by the STA 1; receive on channel 2, in a time period from t2 to t3, the radio signal sent by the STA 1; and receive on channel 1, in a time period from t3 to t4, the radio signal sent by the STA 1.

Communication processes between the STA 2 and the STA 3 and the AP are similar to the communication process between the STA 1 and the AP. For example, the STA 2 sends a radio signal on channel 2 in the time period from t1 to t2; sends a radio signal on channel 1 in the time period from t2 to t3; and sends a radio signal on channel 3 in the time period from t3 to t4. Correspondingly, the AP receives on channel 2, in the time period from t1 to t2, the radio signal sent by the STA 2; receives on channel 1, in the time period from t2 to t3, the radio signal sent by the STA 2; and receives on channel 3, in the time period from t3 to t4, the radio signal sent by the STA 2. For another example, the STA 3 sends a radio signal on channel 1 in the time period from t1 to t2; sends a radio signal on channel 3 in the time period from t2 to t3; and sends a radio signal on channel 2 in the time period from t3 to t4. Correspondingly, the AP receives, in the corresponding time periods, on the corresponding channels, the radio signals sent by the STA 3.

Because the AP has a capability of transmission on a relatively wide bandwidth, the AP can simultaneously receive and process radio signals from a plurality of channels. Therefore, the AP can receive, on three different channels at the same time, radio signals sent by the STA 1, STA 2, and STA 3 respectively.

In the channel negotiation process shown in FIG. 7*a*, the AP may separately send, to the STA 1, STA 2, and STA 3, a message for indicating channel hoppings. To reduce channel negotiation time, the AP may also simultaneously send, in one message, a message for channel hoppings to the STA 1, STA 2, and STA 3.

For continuous track of the state information of the intermediate object, the channel hopping order in the first message sent by the first device to the second device in step 61 may be a channel hopping order for a relatively large quantity of channels, in which a relatively large quantity of bits are occupied. Considering that the quantity of channels is limited, the first device may indicate to the second device to send radio signals on the same channel at different time points. This application proposes a method for indicating, by the first device to the second device, the quantity of channel hopping repetitions. In this case, the channel hopping indication sent by the first device to the second device in step 62 may further include the quantity of channel hopping repetitions, where the quantity of channel hopping repetitions is used to indicate the quantity of times that the channel hopping order is executed repeatedly by the second device. The quantity of times may be 1, 2, or more.

If there are more devices participating in the measurement task, the same quantity of channel hopping repetitions may be included in messages for indicating channel hoppings that are sent by the first device to the plurality of devices that participate in the measurement task. For example, the quantity of channel hopping repetitions included in the second message sent by the first device to the third device is the same as that included in the first message sent by the first device to the second device.

Still using FIG. 7*a* as an example, a channel hopping order indicated by the AP to the STA 1 is channel 1, channel 2, and channel 3. The AP may further indicate that the quantity of channel hopping repetitions is 1. Then, the AP executes channel hoppings based on the channel hopping order of channel 1, channel 2, and channel 3. After executing the channel hoppings, the STA 1 does not need to execute more channel hoppings, or hops directly back to the primary channel. If the AP indicates that the quantity of channel hopping repetitions is 3, the STA 1 executes channel hoppings based on the channel hopping order of channel 1, channel 2, and channel 3. After executing the channel hoppings, the STA 1 executes channel hoppings based on the channel hopping order of channel 1, channel 2, and channel 3 again, and executes channel hoppings based on the channel hopping order of channel 1, channel 2, and channel 3 for a third time. A total of three hopping repetitions are executed based on the channel hopping order.

Figure 7B:
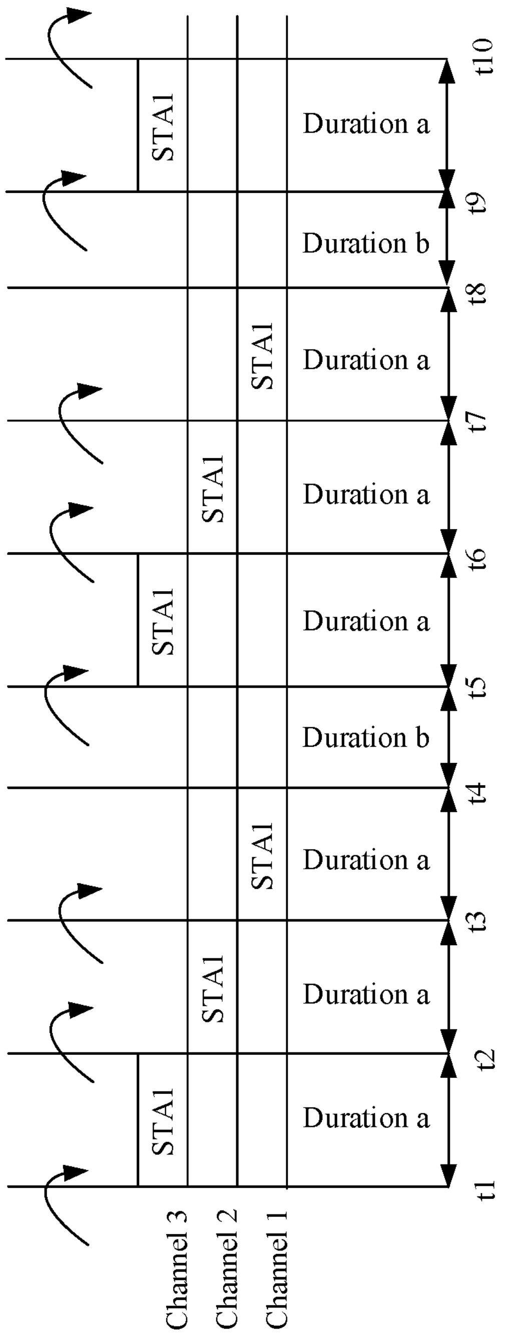

If the second device needs to repeatedly execute channel hoppings for a plurality of times based on the channel hopping order, after completing the channel hoppings based on the channel hopping order, the second device may immediately start to repeatedly execute the channel hoppings based on the channel hopping order for a second time. As shown in FIG. 7*b*, it is assumed that the AP indicates to the STA 1 to execute three repetitions based on the channel hopping order. Then, the STA 1 hops to channel 3 at time t4, and hops to channel 2 and channel 1 successively based on time interval a, in which case duration b in FIG. 7*b* is 0.

To implement continuous tracking, the AP may set a relatively large quantity of channel hopping repetitions. However, generally, a channel hopping is performed in milliseconds. Even if it repeated for a plurality of times, the entire signal measurement process lasts still only milliseconds, at most 1 s, 2 s, or the like. In such a short time, the state information of the intermediate object generally does not change, and continuous tracking is meaningless. Based on this, the AP may send another channel hopping indication to the STA after a period of time (for example, 2 s or 3 s).

To further reduce signaling interactions, the AP may further indicate to the STA a channel hopping repetition time interval, that is, indicate a time interval b between an end time of executing the channel hopping order for the $n^{th}$ time by the STA and a start time of executing the channel hopping order for the $(n+1)^{th}$ time by the STA, where n is an integer greater than or equal to 1. In this case, the first message in step 61 may further include a channel hopping repetition time interval.

If there are more devices participating in the measurement task, the same channel hopping repetition time interval may be included in messages for indicating channel hoppings that are sent by the first device to the plurality of devices that participate in the measurement task. For example, a channel hopping repetition time interval included in the second message sent by the first device to the third device is the same as that included in the first message sent by the first device to the second device.

As shown in FIG. 7*a* and FIG. 7*b*, the STA 1 completes the channel hoppings based on the channel hopping order for the first time at time t4. The STA 1 may wait for duration b on the basis of time t4, that is, hop to channel 3 at time t5; wait for duration a on channel 3, that is, hop to channel 2 at time t6; wait for duration a on channel 2, that is, hop to channel 1 at time t7; and wait for duration a on channel 1, that is, complete the channel hoppings based on the channel hopping order for the second time at time t8. If the quantity of channel hopping repetitions is greater than 2, the STA 1 may execute the channel hoppings based on the channel hopping order for the third time. For example, the STA 1 may wait for duration b on the basis of time t8, that is, hop to channel 1 at time t9; and wait for duration a on channel 1, . . . until the plurality of channel hopping repetitions are completed. The channel hopping repetition time interval b may be, for example, 1 s, 3 s, or the like. During the time period from t4 to t5 and that from t8 to t9, the STA 1 may stay on channel 1 or hop back to the primary channel first.

Figure 6:
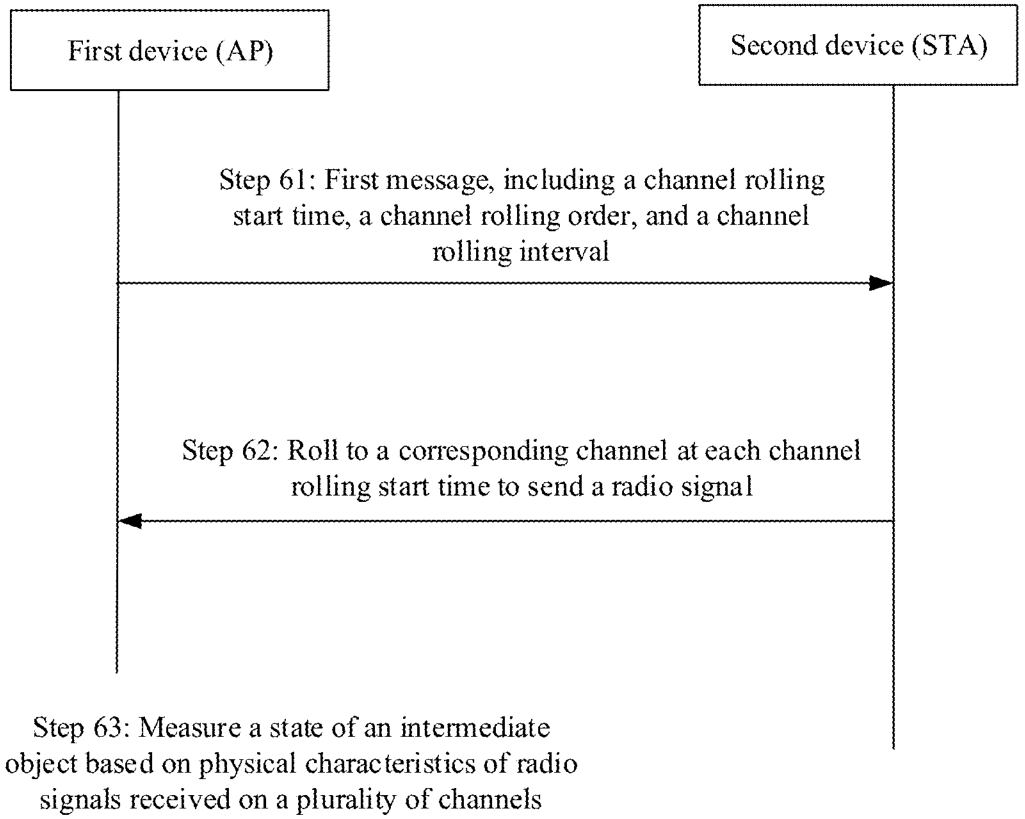
Figure 8A:
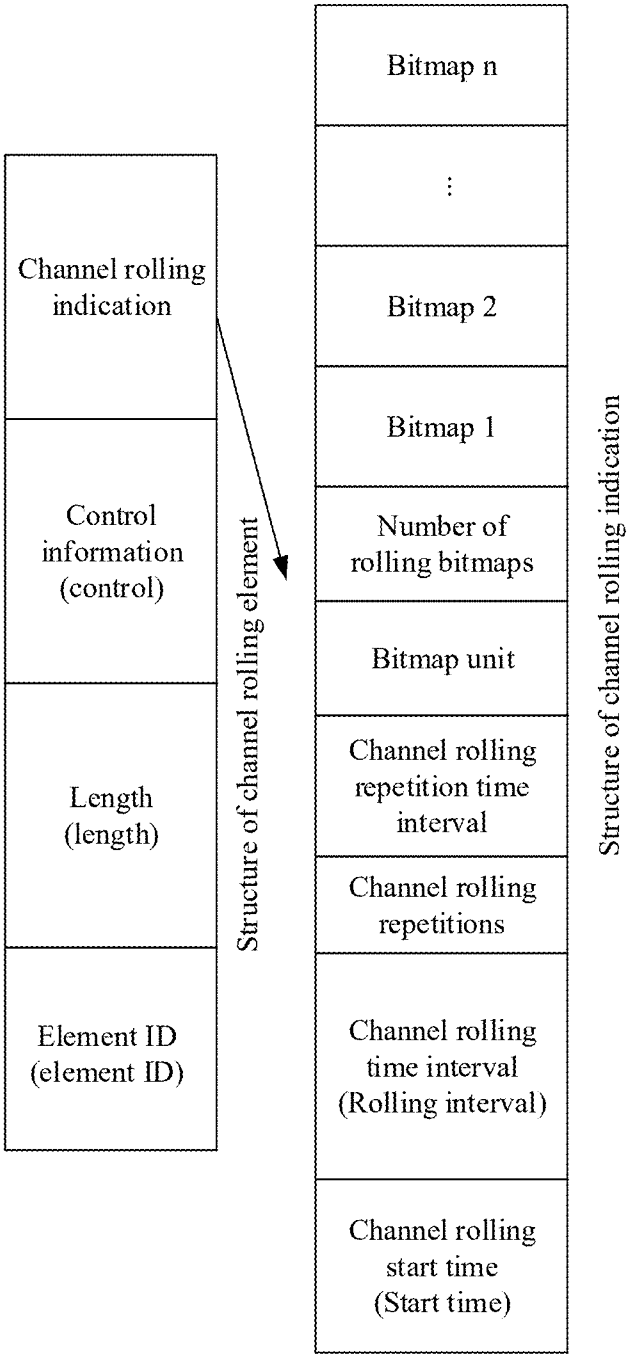

In FIG. 6, a message sent by the first device to indicate channel hoppings, for example, a first message or a second message, may include a frame structure shown in FIG. 8*a*. For ease of distinguishing, when the first device serves as a measurer and the second device serves as an illuminator, a frame included in the first message sent by the first device to the second device is defined as a trigger frame.

The trigger frame structure includes “n “element ID”” field, “a “length”” field, “a “control information”” field, and “a “channel hopping indicat”on” field. The channel hopping indication field includes “a “channel hopping start time”” field, “a “channel hopping time interval”” field, “a “channel hopping repetiti”ns” field, “a “channel hopping repetition time inter”al” field, “a “bitmap u”it” field, “a “number of hopping bitm”ps” field, a “d “bit”ap” fields, for example, bitmap 1, bitmap 2, . . . , and bitmap n. The fields in t“e “channel hopping indicat”on” field may not be limited to any specific order.

In this application, the frame structure shown in FIG. 8*a* is defined as “a “channel hopping elem”nt”. Functions of the element ID, length, and control information are the same as those in the conventional technology. For example, the element ID is used to identify an element as a channel hopping element, the length is used to identify the quantity of bits occupied by the channel hopping element, and the control information is information such as a power management mode.

T“e “bit”ap” fields and t“e “bitmap u”it” field may jointly indicate channel identifiers. The bitmap unit refers to a channel level, indicating how much bandwidth is occupied by a channel, for example, 10 MHz or 20 MHz. Bits occupied by t“e “bit”ap” field are variable in quantity. The quantity of bits occupied by one bitmap field may be determined by a maximum number of channels currently allowed. Each bit corresponds to one channel. For example, the bit with a value set to 1 means that the channel is available. An order of bitmaps is a channel hopping order. For example, a channel hopping order is channel 1, channel 2, and channel 3. Then, the bitmap 1 indicates that channel 1 is available, the bitmap 2 indicates that channel 2 is available, and the bitmap 3 indicates that channel 3 is available.

For example, a 100 MHz bandwidth may be divided into five channels by a unit of 20 MHz. In this case, one bitmap field may occupy five bits. For example, when the AP indicates to the STA to hop to the first channel, a field value of the bitmap unit may be 10000, with the first bit being 1 indicating that the first channel is available, which may also be understood as an identifier of the first channel.

The number of hopping bitmaps refers to the quantity of channel hoppings, indicating how many channels radio signals are to be sent on. For example, if the AP indicates that there are three channels in a channel hopping order for the STA, the number of hopping bitmaps is 3.

Figure 8B:
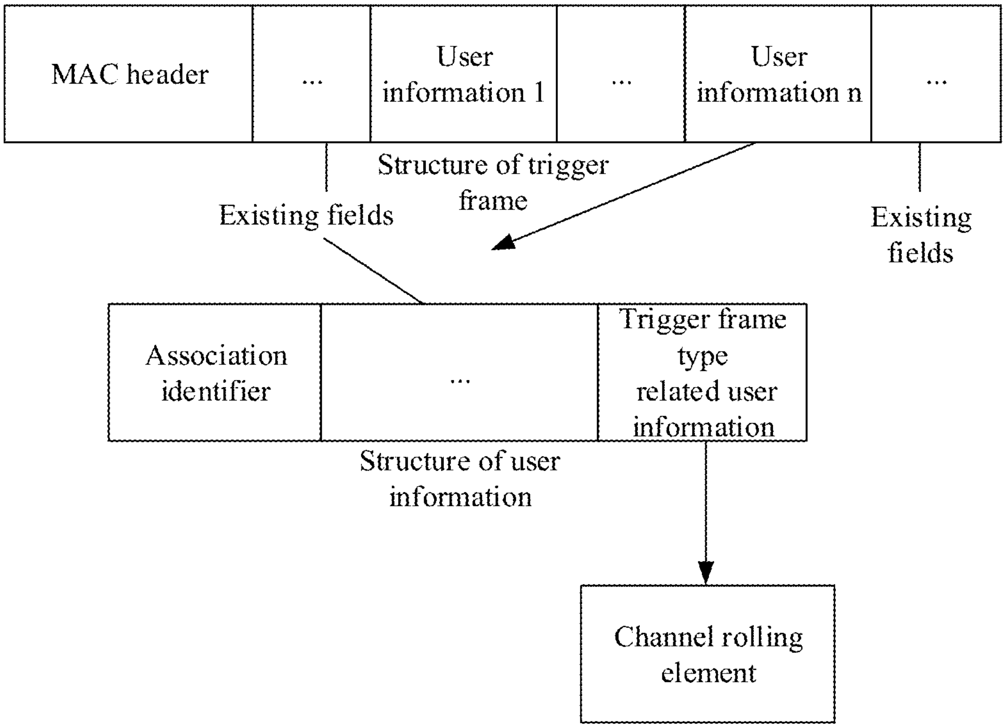

The channel hopping element shown in FIG. 8*a* may be located in the trigger frame structure shown in FIG. 8*b*. The trigger frame structure is already defined which includes “a “MAC hea”er” field, and t“e “MAC hea”er” field includes a source address, a destination address, and the like. T“e “MAC hea”er” field is followed by another field, for example, “a “user informat”on” field, and t“e “user informat”on” field includes “n “association identif”er” field, “a “trigger frame type related user informat”on” field, and some existing fields. The channel hopping element shown in FIG. 8*a* may be located in t“e “trigger frame type related user informat"on" field. An identifier of a device (such as the second device) participating in the measurement task can be carried in a destination address. When the first device sends a message for indicating channel hoppings to a plurality of devices participating in the measurement task, o"e "user informat"on" field corresponds to one device. "n "association identif"er" field in o"e "user informat"on" field can carry an identifier of one device.

The quantity of bits occupied by each field in FIG. 8*a* and FIG. 8*b* may be set according to an actual requirement. For example, in FIG. 8*b*, a user information field may occupy five or more bits. In FIG. 8*a*, a channel hopping start time may occupy 16 bits, 14 bits, or the like.

The foregoing FIG. 4, FIG. 5, and FIG. 6 describe a communication manner in which a first device serves as a receive end (measurer) and a target device (for example, a second device) serves as a transmit end (illuminator). Next, a communication manner in which a first device serves as a transmit end (illuminator) and a target device (for example, a second device) serves as a receive end (measurer) is described. The difference lies in that when a first device serves as a receive end, the first device may directly consolidate the physical characteristics of the radio signals received on a plurality of different channels to measure state information of an intermediate object. In the following embodiment, with a first device as a transmit end, after a second device hops to a corresponding channel based on an indication of the first device, the second device receives a radio signal sent by the first device instead of sending a radio signal. Because the second device does not have a multi-channel processing capability, the second device needs to feed back the physical characteristics of the radio signals received on each channel to the first device, and the first device measures state information of an intermediate object. Other details are the same, and are not repeated in here.

Still using a second device as an example, a communication process of measuring state information of an intermediate object is described in detail as follows. The second device is any device that participates in a measurement task, and may also be referred to as a third device, a fourth device, or the like.

Figure 9:
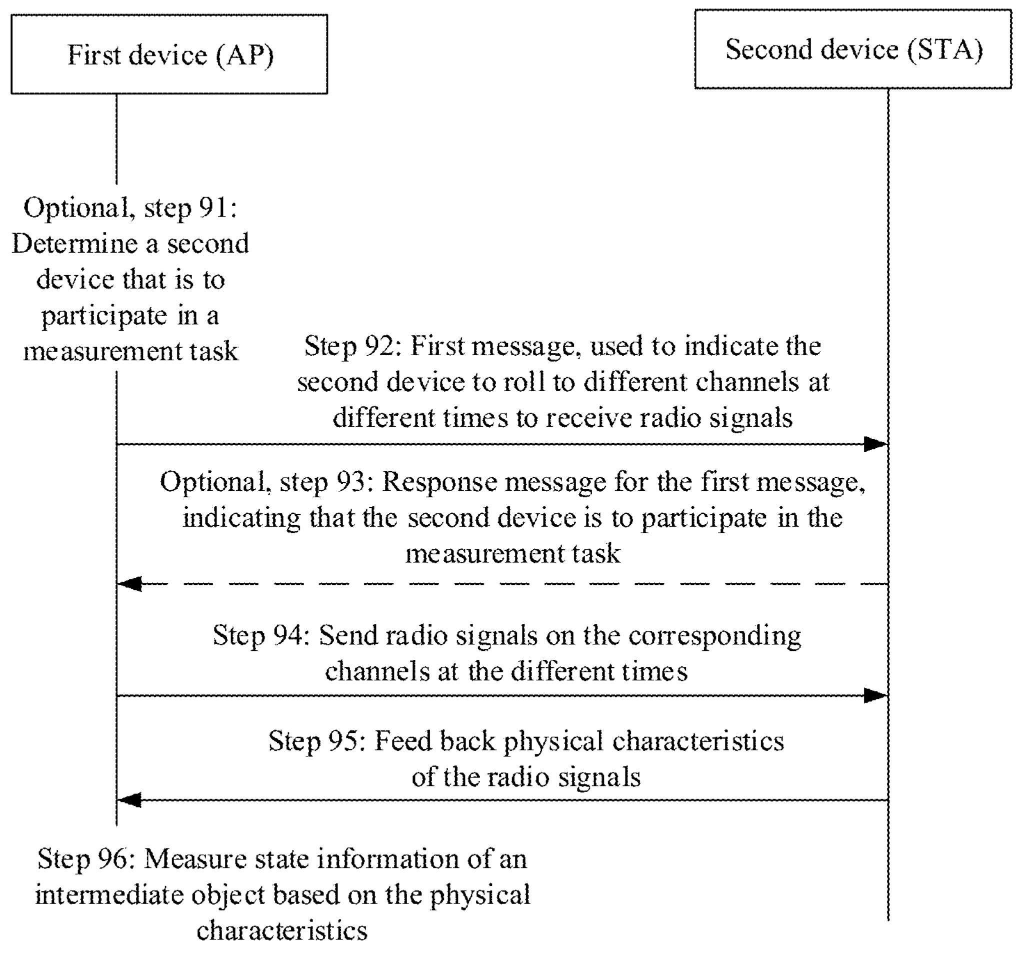

Referring to FIG. 9, a communication process of measuring state information of an intermediate object includes the following steps.

Optionally, step 91: A first device determines a second device that is to participate in a measurement task.

Step 91 is the same as step 41.

Step 92: The first device sends a first message to the second device, and correspondingly, the second device receives the first message sent by the first device. The first message is used to indicate to the second device to hop to different channels at different times to receive radio signals.

For example, the first device indicates to the second device to hop to channel 1 at 10:00 to receive a radio signal, and hop to channel 2 at 10:01 to receive a radio signal.

Frequency bandwidth ranges of any two channels indicated by the first message do not completely overlap, and a frequency bandwidth range of each channel is within a total frequency bandwidth range supported by the first device. For example, the second device supports only a transmission capability of 20 MHz, and the first device supports a transmission capability in a bandwidth range of 0 to 80 MHz. A frequency bandwidth range of channel 1 may be 0 to 20 MHz, and a frequency bandwidth range of channel 2 may be 60 MHz to 80 MHz. Alternatively, a frequency bandwidth range of channel 1 may be 40 to 55 MHz, and a frequency bandwidth range of channel 2 may be 50 MHz to 70 MHz.

Step 93: The second device sends, to the first device, a response message for the first message, where the response message is used to indicate that the second device agrees to participate in the measurement task.

Step 94: The first device separately sends radio signals to the second device on the different channels at the different times based on the first message. Correspondingly, the second device may hop successively to the different channels at the different times based on the first message to receive the radio signals sent by the first device.

The radio signals sent by the first device reach the second device after being reflected by an intermediate object located between the first device and the second device.

For example, the second device hops to channel 1 at 10:00 based on the indication of the first message, and receives a radio signal sent by the first device on channel 1. At 10:01, the second device hops again to channel 2, and receives a radio signal sent by the first device on channel 2.

Step 95: The second device extracts the physical characteristics of the received radio signals to obtain a plurality of groups of first physical characteristics. The second device feeds back the plurality of groups of first physical characteristics to the first device, and correspondingly, the first device may receive the plurality of groups of first physical characteristics fed back by the second device.

Step 96: The first device measures the state information of the intermediate object based on the plurality of groups of first physical characteristics.

Optionally, after receiving the radio signals sent by the first device, the second device may return an acknowledgment message ACK to the first device, indicating that the radio signals sent by the first device are received.

Through the foregoing process, the first device indicates to the second device to hop to different channels at different times to receive radio signals. The second device transmits radio signals on at least two channels. Such radio signals occupy a wider frequency bandwidth than radio signals transmitted on one channel in the conventional technology, and therefore a frequency bandwidth for transmitting radio signals can be improved. Then, the first device can measure the state information of the intermediate object based on the physical characteristics of the radio signals transmitted on the wider frequency bandwidth, thereby improving measurement accuracy. In addition, the second device is directed to perform at least two channel hoppings, through one message exchange with the first device. Compared with one message exchange indicating only one channel hopping, channel negotiation time is reduced, implementing timely measurement.

If the first device determines that a plurality of target devices are to participate in the measurement task, including a third device, a fourth device, and so on in addition to the second device, the first device may further notify, in a manner similar to the foregoing, the plurality of devices such as the third device and the fourth device to participate in the measurement task.

An example in which the first device synchronously indicates to a third device to participate in the measurement task is used below for detailed description.

First, the first device may further send a second message to the third device, and correspondingly, the third device receives the second message sent by the first message, where the second message may be used to indicate to the third device to hop to the different channels at different times to receive radio signals. The plurality of channels to be hopped to as indicated by the second message may be the same as those indicated by the first message, but the second device and the third device hop to the same channel at different hopping times.

Then, the first device may send radio signals to the third device successively on the different channels at the different times based on the indication of the second message. Correspondingly, the third device hops successively to the different channels at the different times based on the indication of the second message to receive the radio signals sent by the first device. The radio signals sent by the first device reach the third device after being reflected by the intermediate object.

Further, the third device extracts the physical characteristics of the received radio signals to obtain a plurality of groups of second physical characteristics. The third device feeds back the plurality of groups of second physical characteristics to the first device, and correspondingly, the first device receives the plurality of groups of second physical characteristics fed back by the third device.

Finally, the first device may measure the state information of the intermediate object based on the plurality of groups of first physical characteristics and the plurality of groups of second physical characteristics.

The first device not only indicates to the second device to participate in the measurement task, but may also indicate to the third device to participate in the measurement task. With the first device indicating to a plurality of devices to participate in the measurement task and further consolidating the physical characteristics of the radio signals of the plurality of devices that participate in the measurement task, measurement accuracy can be further improved.

If there are more devices participating in the measurement task, the first device may measure the state information of the intermediate object based on the groups of physical characteristics separately fed back by the plurality of devices.

The operations performed by the third device or another device participating in the measurement task differ from those performed by the second device only in the channel hopping order. Other details are the same and are not repeated in here.

When indicating to a plurality of devices to participate in the measurement task, the first device may notify, in one message, the plurality of devices to perform channel hoppings, to reduce signaling interactions, allowing the measurement task to be executed as quickly as possible. For example, that the first device sends the first message to the second device and sends the second message to the third device may be that the first device sends a third message to the second device and the third device once, where the third message includes the first message and the second message.

In the communication manner in which the first device serves as the transmit end, a channel negotiation process in which the first device serves as the receive end may still be used, for example, step 51 in FIG. 5 and step 61 in FIG. 6. The following describes, by using an embodiment, content of a message for indicating channel hoppings.

Figure 10:
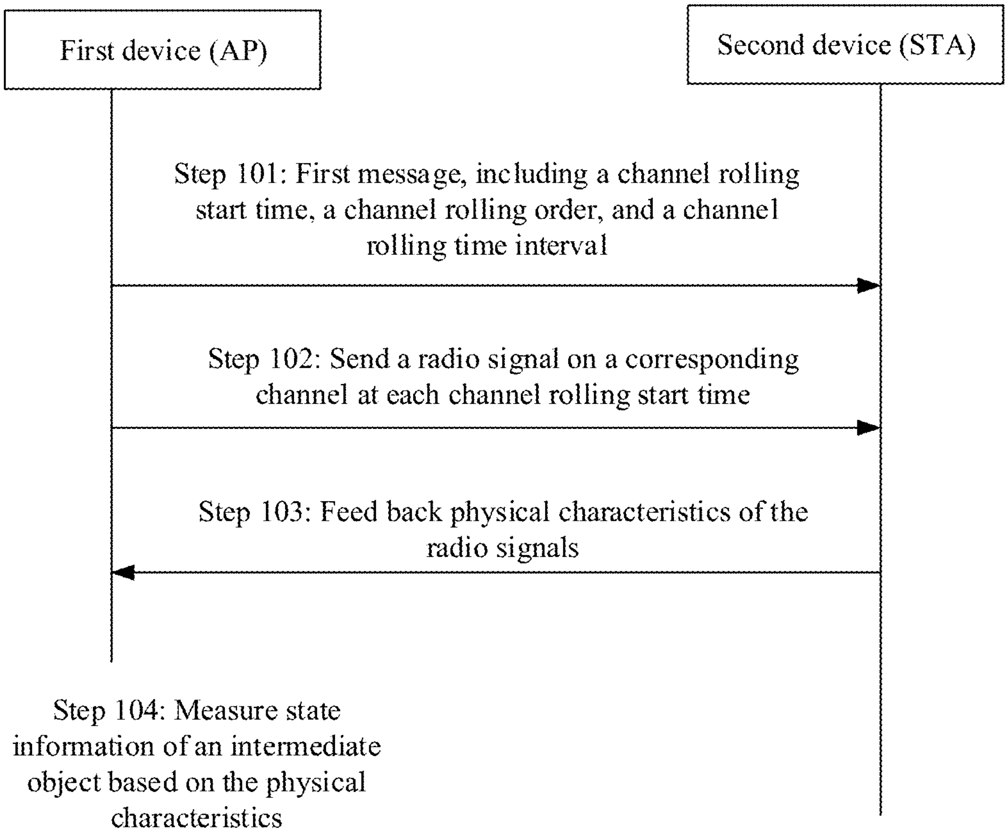

As shown in FIG. 10, this application provides a communication process of measuring state information of an intermediate object. A first message sent by a first device to a second device is used as an example to describe a process in which the first device indicates to the second device to perform a plurality of channel hoppings in one message exchange with the second device. Content of a message for indicating channel hoppings in this communication manner is the same as content of a message for indicating channel hoppings in the communication manner shown in FIG. 6.

Step 101: A first device sends a first message to a second device, and correspondingly, the second device receives the first message sent by the first device, where the first message includes identifiers of at least two channels and a channel hopping start time corresponding to the identifier of each channel. Identifiers of the plurality of channels are different from each other, and a plurality of channel hopping start times are different from each other. Step 101 is the same as step 61.

A message (for example, a first message or a second message) shown in FIG. 10 for indicating channel hoppings that is sent by the first device to a device (for example, a first device or a second device) that participates in the measurement task may include a channel hopping element shown in FIG. 8*a*, to carry a channel hopping start time, a channel hopping time interval, and a channel hopping order, and further, may also carry information such as the quantity of channel hopping repetitions and the channel hopping repetition time interval.

Figure 12A:
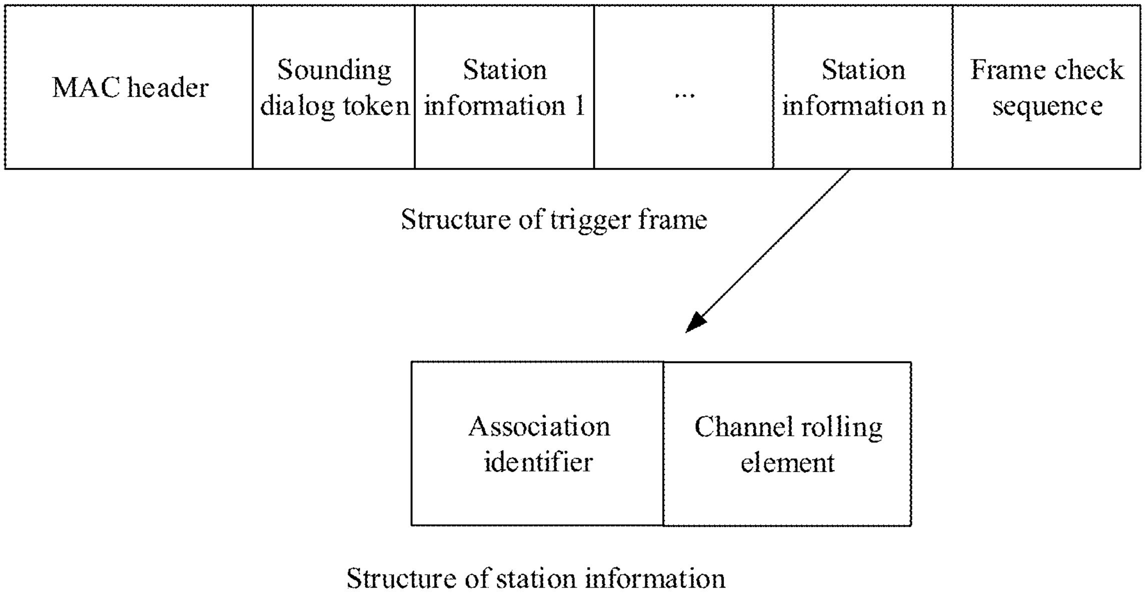

For ease of distinguishing, when the first device serves as an illuminator, and the device participating in the measurement task serves as a measurer, a frame included in a message for indicating channel hoppings that is sent by the first device to the device participating in the measurement task is defined as a notification frame. As shown in FIG. 12*a*, a notification frame may include “a “MAC hea”er” field, “a “sounding dialog to”en” feel“, “station information (STA in”o)” fields, for example, station information 1, station information 2, . . . , and station information n, and “a “frame check seque”ce” field. T“e “station informat”on” field may include an “associati39esolute“f”er” field and a “chan“el hopping elem”nt” field. T“e “channel hopping element fi”ld” herein is the channel hopping element shown in FIG. 8*a*. An identifier of a device participating in the measurement task may be carried in a destination address of a MAC field. When the first device sends, to a plurality of devices, a message for indicating channel hoppings, o“e “station informat”on” field corresponds to one device participating in the measurement task. An “association identifier” field in one “station information” field may carry an identifier of one device.

Step 102: After receiving the first message sent by the first device, the second device may determine, based on the channel hopping start time, the channel hopping time interval, and the channel hopping order in the first message, a channel hopping start time corresponding to each channel, and then hop to a corresponding channel at each channel hopping start time to receive a radio signal. Correspondingly, the first device may send, on the corresponding channel at the corresponding channel hopping start time, the radio signal to the second device.

Step 103: The second device extracts the physical characteristics of the received radio signals to obtain a plurality of groups of first physical characteristics. The second device feeds back the plurality of groups of first physical characteristics to the first device, and correspondingly, the first device may receive the plurality of groups of first physical characteristics fed back by the second device. Step 103 is the same as step 95.

Step 104: The first device measures state information of the intermediate object based on the plurality of groups of first physical characteristics. Step 104 is the same as step 96.

Because a channel hopping order included in the first message sent by the first device to the second device is a hopping order for at least two channels, the second device can be directed to perform at least two channel hoppings, through one message exchange with the first device, to reduce channel negotiation time, implementing timely measurement.

Figure 11:
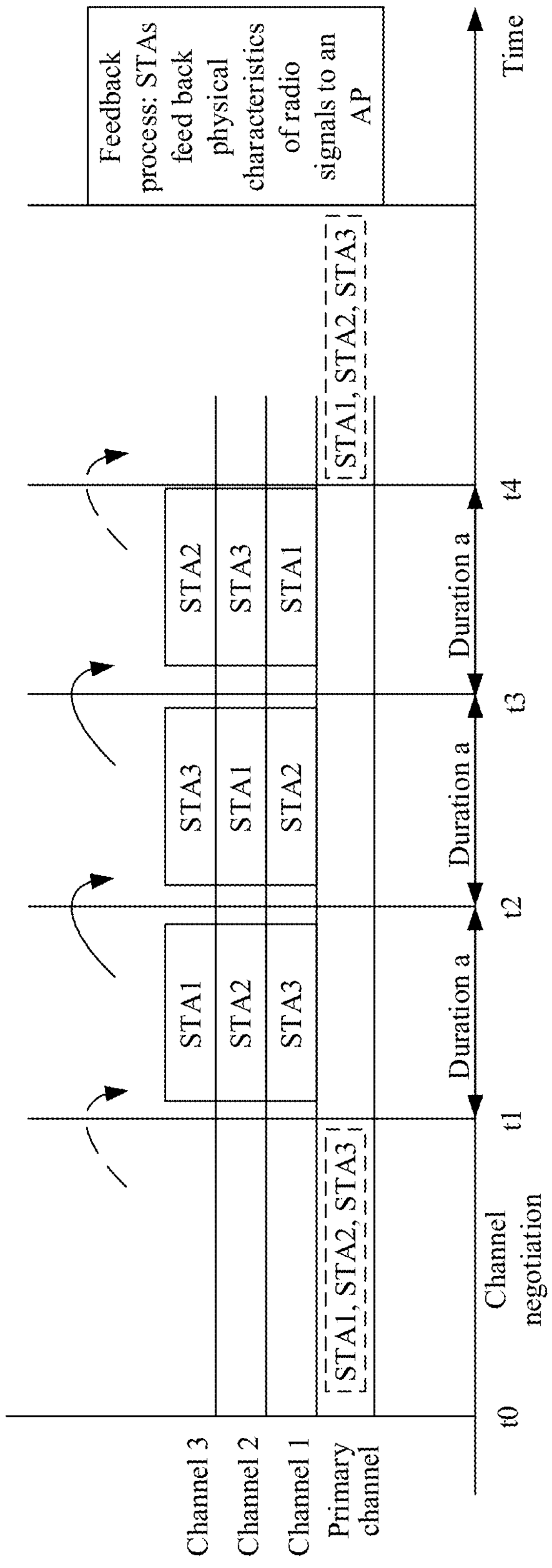

For ease of description, the physical characteristics of the radio signals received by the first device in step 95 and step 103 are defined as measurement data, and when the second device feeds back the measurement data to the first device, two feedback types are provided. One type is timely feedback, where the second device feeds back measurement data of a single channel to the first device before hopping to a next channel; and the other type is aggregated feedback, where the second device feeds back measurement data of a plurality of channels to the first device after performing the channel hoppings, for example, after performing all channel hoppings. FIG. 11 shows an aggregated feedback mode, which differs from FIG. 7*a* in that there is a feedback process following a measurement process, for each STA to feed back a group of physical characteristics of received radio signals to the AP.

For aggregated feedback, the second device may perform feedback on the last channel to which the second device hops, or may perform feedback after hopping back to the primary channel.

The measurement data herein may also be classified into two types. One type is raw physical characteristics of a radio signal received by the second device, that is, raw measurement data, for example, a channel state. The channel state is, for example, a value of a given subcarrier at a given sampling point. The value may reflect a delay or a Doppler frequency shift. The other type is processed measurement data, which may be, for example, a distance, a speed, an azimuth, and the like of an intermediate object. An existing signal processing process may be used for processing the measurement data.

For raw measurement data, if the first device receives only a part of raw measurement data fed back by the second device, the first device may perform signal processing by using the received part of raw measurement data, or the first device requests the second device to retransmit the unreceived part of raw measurement data. In this case, the second device needs to have a capability of temporarily storing raw measurement data.

For processed measurement data, if the first device fails to receive only a part of processed measurement data fed back by the second device, the first device may request the second device to retransmit the part of processed measurement data that is not received.

When feeding back the measurement data to the first device, the second device may use a plurality of feedback modes, and the feedback mode includes a feedback type and a type of measurement data. For example, one feedback mode is to feed back raw measurement data by using an aggregate feedback type, and one feedback mode is to feed back raw measurement data by using a timely feedback type. A feedback mode used by the second device to perform feedback may be specified in a protocol. The first device may alternatively indicate to the second device which feedback mode is to be used for performing feedback. When indicating to the second device which feedback mode is to be used for performing feedback, the first device may provide the indication in a message frame different from the first message. To reduce signaling overheads, the indication may alternatively be provided in the first message. In this case, the channel hopping indication in step 92 in FIG. 9 may further include a measurement data feedback mode.

Figure 12B:
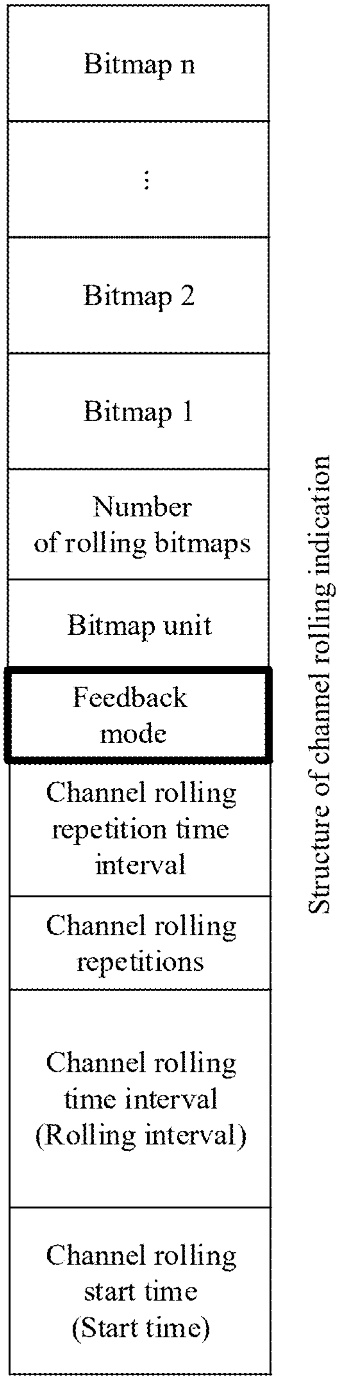

As shown in FIG. 12*b*, a difference from t“e “channel hopping elem”nt” shown in FIG. 8*a* lies in that “a “channel hopping indicat”on” field in the channel hopping element shown in FIG. 12*b* includes “a “feedback m”de” field. The feedback mode may be indicated by a value of t“e “feedback m”de” field. For example, when the field takes a value of 1, the feedback mode is timely feedback, with raw measurement data fed back. When the field takes a value of 2, the feedback mode is aggregated feedback, with processed measurement data fed back. When the field takes a value of 3, the feedback mode is aggregated feedback, with raw measurement data fed back, and so on.

Generally, the same feedback mode is included in messages for indicating channel hoppings that are sent by the first device to a plurality of devices that participate in the measurement task. That is, the second devices participating in the measurement task are directed to use the same feedback mode to perform feedback.

T“e “channel hopping indicat”on” field shown in FIG. 12*b* may be applied to a trigger frame. To be specific, t“e “channel hopping indicat”on” field shown in FIG. 12*b* may alternatively substitute for t“e “channel hopping indicat”on” field shown in FIG. 8*a*, to be used in the communication manner shown in FIG. 6 in which the second device serves as an illuminator and the first device serves as a measurer. In the communication manner shown in FIG. 6, the second device does not need to feed back measurement data, and may use a value of t“e “feedback m”de” field to indicate that measurement data does not need to be fed back. For example, a value of the field being 0 indicates that a trigger frame receiver (that is, the second device) does not need to feed back measurement data.

Figure 13:
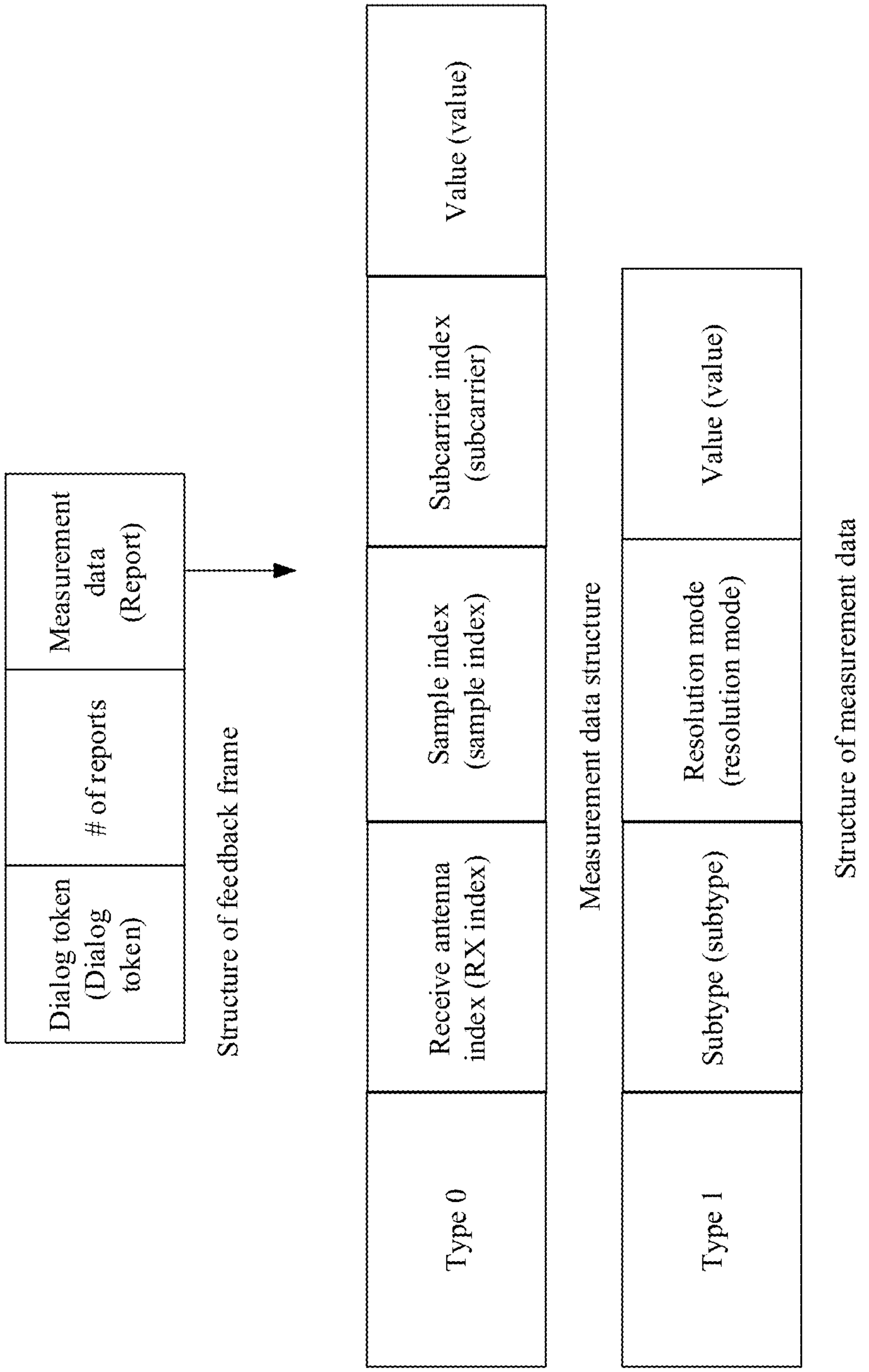

In feeding back the measurement data to the first device in step 95 and step 103, the second device may perform feedback by using a feedback frame shown in FIG. 13. The feedback frame includes “a “dialog to”en” field, which corresponds to t“e “sounding dialog to”en” in FIG. 12*a*.

There are two types of measurement data (Report). One is raw measurement data and the other is processed measurement data. For example, the following is an example:

For example, type 0 refers to raw measurement data, content of which may include a receive antenna index (RX index), representing an index of an antenna used by the second device to receive a radio signal, a sample index, a subcarrier index, and a value, indicating a value of a given subcarrier at a given sampling point.

For example, type 1 refers to processed measurement data, where the value of a “subtype” field indicates the type of processed measurement data, for example, a time of flight (ToF), a Doppler, or an angle of arrival (AoA), where the time of flight is used for calculating a distance, the Doppler is used for calculating a speed, and the angle of arrival is used for calculating an azimuth. A “resolution mode” field may also be included, which is used to indicate resolution of a value and may be, for example, high resolution or low resolution. The resolution mode is used to indicate whether a bandwidth splicing technology needs to be used to obtain high-resolution measurement data. For example, when processing measurement data, the STA may process measurement data of a single channel to obtain data of lower resolution, or may perform consolidation processing on measurement data of a plurality of channels to obtain data of higher resolution. An AP may indicate what the STA needs to do. A "# of reports" field indicates a number of pieces of measurement data (Report). The second device may require a plurality of pieces of measurement data (Report) to indicate the physical characteristics of the radio signals received on a single channel within a specific time period. For example, if two values of Doppler or angle of arrival are measured, each value needs to be represented by a report field of type 1. In this case, there are two report fields in total, and the "# of reports" field may be used to indicate 2.

Figure 14:
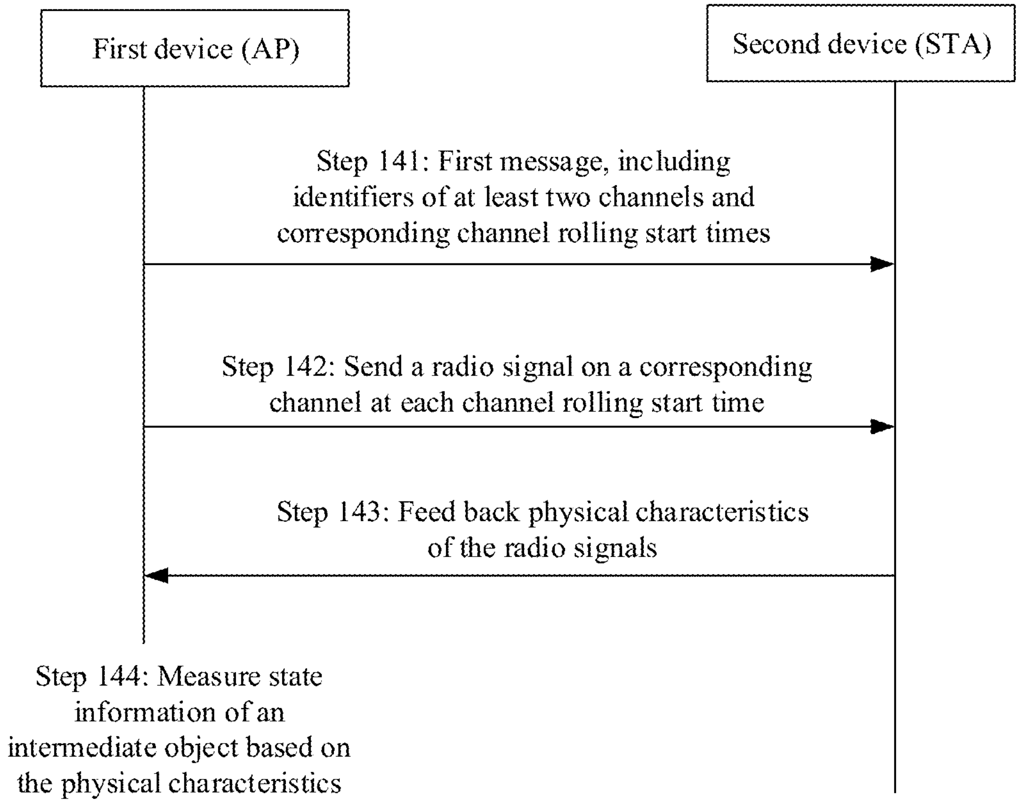

Referring to a communication process of measuring state information of an intermediate object shown in FIG. 14, the following still uses a first message sent by a first device to a second device as an example to describe a process in which the first device indicates to the second device to perform a plurality of channel hoppings in one message exchange with the second device. Content of a message for indicating channel hoppings in this communication manner is the same as content of a message for indicating channel hoppings shown in FIG. 5. The communication procedure shown in FIG. 14 differs from that shown in FIG. 13 in the content of the message for indicating channel hoppings. Other technical details are the same, and repeated parts are not described again.

Step 141: A first device sends a first message to a second device, and correspondingly, the second device receives the first message sent by the first device, where the first message includes identifiers of at least two channels and a channel hopping start time corresponding to the identifier of each channel. Identifiers of the plurality of channels are different from each other, and a plurality of channel hopping start times are different from each other. Step 141 is the same as step 51.

Step 142: The second device hops to a channel of a corresponding identifier at each channel hopping start time based on the first message, and receives a radio signal. Correspondingly, the first device sends, on the channel of the corresponding identifier at each channel hopping start time, the radio signal to the second device.

Step 143: The second device extracts the physical characteristics of the received radio signals to obtain a plurality of groups of first physical characteristics. The second device feeds back the plurality of groups of first physical characteristics to the first device, and correspondingly, the first device may receive the plurality of groups of first physical characteristics fed back by the second device. Step 143 is the same as step 95.

Step 144: The first device measures state information of the intermediate object based on the plurality of groups of first physical characteristics. Step 144 is the same as step 96.

The foregoing describes the measurement method in embodiments of this application, and the following describes a measurement apparatus in embodiments of this application.

Figure 15:
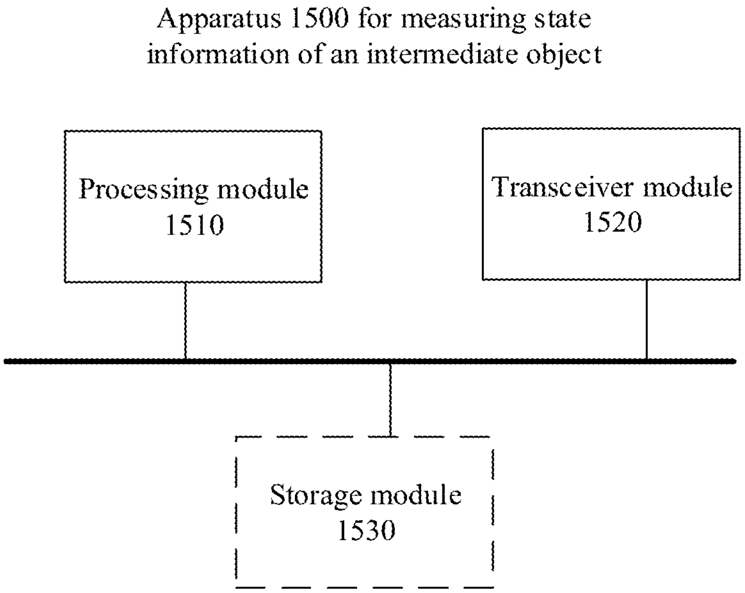
FIG. 15, FIG. 16, FIG. 17, and FIG. 18 each show an apparatus for measuring state information of an intermediate object according to an embodiment of this application.

Based on the same technical idea as the foregoing measurement method, an apparatus 1500 for measuring state information of an intermediate object is provided as shown in FIG. 15. The apparatus 1500 can perform the steps that are performed by a first device in the methods in FIG. 4, FIG. 5, FIG. 6, FIG. 9, FIG. 10, and FIG. 14. To avoid redundancy, details are not repeated herein. The apparatus 1500 may be a first device, or may be a chip applied in a first device. The apparatus 1500 may include a transceiver module 1520, a processing module 1510, and optionally, further includes a storage module 1530. The processing module 1510 may be separately connected to the storage module 1530 and the transceiver module 1520, and the storage module 1530 may also be connected to the transceiver module 1520.

In an implementation, the transceiver module 1520 may be configured to: send a first message to a second device, where the first message is used to indicate to the second device to hop to different channels at different times to send radio signals, frequency bandwidth ranges of any two channels do not completely overlap, and a frequency bandwidth range of each channel is within a total frequency bandwidth range supported by the apparatus; and separately receive radio signals that are sent by the second device successively on the different channels at the different times, where the radio signals sent by the second device reach the apparatus after being reflected by an intermediate object located between the apparatus and the second device. The processing module 1510 may be configured to measure the state information of the intermediate object based on the physical characteristics of the different radio signals that are separately received.

Further, the transceiver module 1520 may further be configured to: send a second message to a third device, where the second message is used to indicate to the third device to hop to the different channels at different times to send radio signals, and the second device and the third device hop to the same channel at different times; and separately receive radio signals that are sent by the third device successively on the different channels at the different times, where the radio signals sent by the third device reach the apparatus after being reflected by the intermediate object. When configured to measure the state information of the intermediate object based on the physical characteristics of the different radio signals that are separately received, the processing module 1510 is configured to measure the state information of the intermediate object based on the physical characteristics of the separately received radio signals that are sent by the second device successively on the different channels at the different times, and the physical characteristics of the separately received radio signals that are sent by the third device successively on the different channels at the different times.

Further, when sending the first message to the second device and sending the second message to the third device, the transceiver module 1520 may be configured to send a third message to the second device and the third device, where the third message includes the first message and the second message.

The storage module 1530 may be configured to store a radio signal receiving time corresponding to each channel.

In another implementation, the transceiver module 1520 may be configured to: send a first message to a second device, where the first message is used to indicate to the second device to hop to different channels at different times to receive radio signals, frequency bandwidth ranges of any two channels do not completely overlap, and a frequency bandwidth range of each channel is within a total frequency bandwidth range supported by the apparatus; send radio signals to the second device successively on the different channels at the different times based on the first message, where the radio signals sent by the apparatus reach the second device after being reflected by an intermediate object located between the apparatus and the second device; and receive a plurality of groups of first physical characteristics fed back by the second device, where the plurality of groups of first physical characteristics are extracted by the second device from the radio signals that are sent by the apparatus and separately received on the different channels. The processing module 1510 may be configured to measure the state information of the intermediate object based on the plurality of groups of first physical characteristics.

Further, the transceiver module 1520 may further be configured to: send a second message to a third device, where the second message is used to indicate to the third device to hop to the different channels at different times to receive radio signals, and the second device and the third device hop to the same channel at different times; send radio signals to the third device successively on the different channels at the different times based on the second message, where the radio signals sent by the apparatus reach the third device after being reflected by the intermediate object; and receive a plurality of groups of second physical characteristics fed back by the third device, where the plurality of groups of second physical characteristics are extracted by the third device from the radio signals that are sent by the apparatus and separately received on the different channels. When configured to measure the state information of the intermediate object based on the plurality of groups of first physical characteristics, the processing module 1510 is configured to measure the state information of the intermediate object based on the plurality of groups of first physical characteristics and the plurality of groups of second physical characteristics.

Further, when configured to send the first message to the second device and send the second message to the third device, the transceiver module 1520 may be configured to send a third message to the second device and the third device, where the third message includes the first message and the second message.

Further, the storage module 1530 may be configured to store a radio signal sending time corresponding to each channel.

Figure 16:
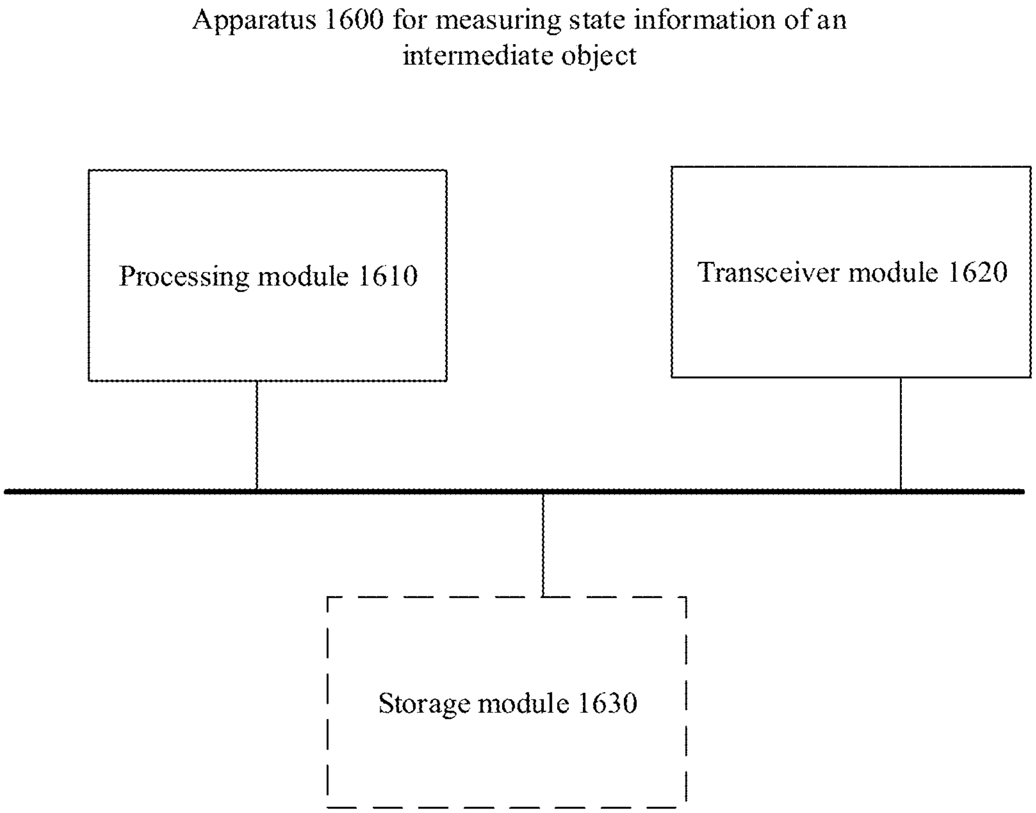

Based on the same technical idea as the foregoing measurement method, an apparatus 1600 for measuring state information of an intermediate object is provided as shown in FIG. 16. The apparatus 1600 can perform the steps performed by a second device in the methods in FIG. 4, FIG. 5, FIG. 6, FIG. 9, FIG. 10, and FIG. 14. To avoid redundancy, details are not repeated herein. The apparatus 1600 may be a second device, or may be a chip applied in a second device. The apparatus 1600 may include a transceiver module 1620, a processing module 1610, and optionally, further includes a storage module 1630. The processing module 1610 may be separately connected to the storage module 1630 and the transceiver module 1620, and the storage module 1630 may also be connected to the transceiver module 1620.

In an implementation, the transceiver module 1620 may be configured to receive a first message sent by a first device, where the first message is used to indicate to the apparatus to hop to different channels at different times to send radio signals, frequency bandwidth ranges of any two channels do not completely overlap, and a frequency bandwidth range of each channel is within a total frequency bandwidth range supported by the first device.

The processing module 1610 may be configured to hop to the different channels at the different times based on the first message.

The transceiver module 1620 may further be configured to separately send radio signals to the first device on the different channels, where the radio signals sent by the apparatus reach the first device after being reflected by an intermediate object located between the first device and the apparatus.

Further, the storage module 1630 may be configured to store a channel hopping start time corresponding to each channel.

In another implementation, the transceiver module 1620 may be configured to: receive a first message sent by a first device, where the first message is used to indicate to the apparatus to hop to different channels at different times to receive radio signals, frequency bandwidth ranges of any two channels do not completely overlap, and a frequency bandwidth range of each channel is within a total frequency bandwidth range supported by the first device; and hop successively to the different channels at the different times based on the first message to receive radio signals sent by the first device, where the radio signals sent by the first device reach the apparatus after being reflected by an intermediate object between the first device and the apparatus. The processing module 1610 may be configured to extract the physical characteristics of the received radio signals to obtain a plurality of groups of physical characteristics. The transceiver module 1620 may further be configured to feed back the plurality of groups of physical characteristics to the first device.

Further, the first message may further include a physical characteristic feedback mode. When configured to feed back the plurality of groups of physical characteristics to the first device, the transceiver module 1620 may be configured to feed back the plurality of groups of physical characteristics to the first device based on the physical characteristic feedback mode.

Further, the storage module 1630 may be configured to store a channel hopping start time corresponding to each channel.

Figure 17:
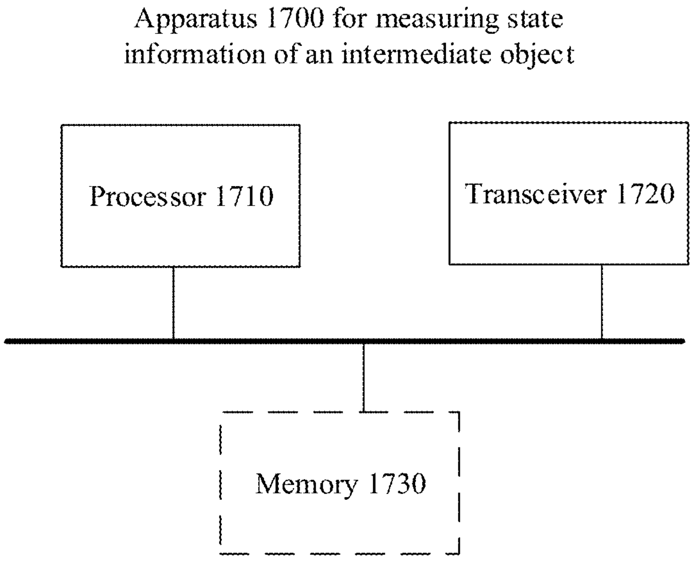

FIG. 17 is a schematic block diagram of an apparatus 1700 for measuring state information of an intermediate object according to an embodiment of this application. It should be understood that the apparatus 1700 can perform the steps performed by a first device in the methods in FIG. 4, FIG. 5, FIG. 6, FIG. 9, FIG. 10, and FIG. 14. To avoid redundancy, details are not repeated herein. The apparatus 1700 includes a processor 1710 and a transceiver 1720, and optionally, further includes a memory 1730. The processor 1710 and the memory 1730 are electrically coupled to each other.

For example, the memory 1730 is configured to store a computer program. The processor 1710 may be configured to invoke a computer program or instructions stored in the memory, to perform, through the transceiver 1720, the foregoing method for measuring state information of an intermediate object.

The processing module 1510 in FIG. 15 may be implemented by using the processor 1710, the transceiver module 1520 may be implemented by using the transceiver 1720, and the storage module 1530 may be implemented by using the memory 1730.

Figure 18:
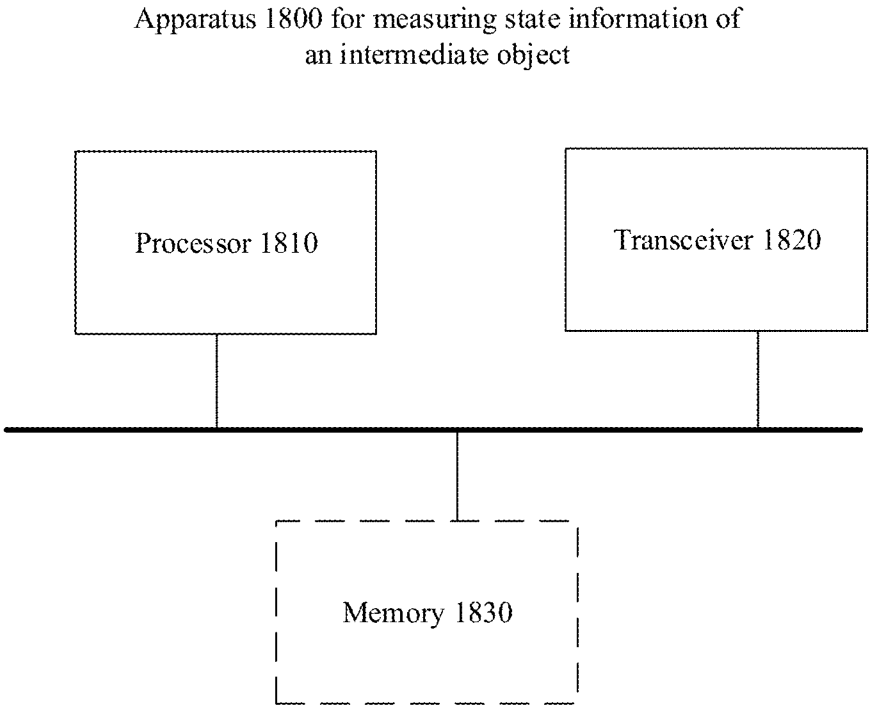

FIG. 18 is a schematic block diagram of an apparatus 1800 for measuring state information of an intermediate object according to an embodiment of this application. It should be understood that the apparatus 1800 can perform the steps performed by a second device in the methods in FIG. 4, FIG. 5, FIG. 6, FIG. 9, FIG. 10, and FIG. 14. To avoid redundancy, details are not repeated herein. The apparatus 1800 includes a processor 1810 and a transceiver 1820, and optionally, further includes a memory 1830. The processor 1810 and the memory 1830 are electrically coupled to each other.

For example, the memory 1830 is configured to store a computer program. The processor 1810 may be configured to invoke a computer program or instructions stored in the memory, to perform, through the transceiver 1820, the foregoing method for measuring state information of an intermediate object.

The processing module 1610 in FIG. 16 may be implemented by using the processor 1810, the transceiver module 1620 may be implemented by using the transceiver 1820, and the storage module 1630 may be implemented by using the memory 1830.

The processor may be a central processing unit (CPU), a network processor (NP), or a combination of a CPU and an NP. The processor may further include a hardware chip or another general-purpose processor. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL) or other programmable logic device, a discrete gate or transistor logic device, a discrete hardware component, or any combination thereof. The general-purpose processor may be a microprocessor, or the processor may be any conventional processor or the like.

It should be further understood that the memory mentioned in embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (Electrically EPROM, EEPROM), or a flash memory. The volatile memory may be a random access memory (RAM), used as an external cache. Through illustrative but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory described in this application aims to include but is not limited to these memories and memories of any other appropriate types.

An embodiment of this application further provides a computer-readable storage medium, where the storage medium stores computer instructions, and when the computer instructions are executed by a computer, the computer is enabled to perform the foregoing method for measuring state information of an intermediate object.

An embodiment of this application further provides a computer program product including instructions. When the computer program product runs on a computer, the computer is enabled to perform the foregoing method for measuring state information of an intermediate object.

An embodiment of this application further provides a system for measuring state information of an intermediate object, where the system includes: a first device and a second device that execute the foregoing method for measuring state information of intermediate object.

A person skilled in the art should understand that embodiments of this application may be provided as a method, a system, or a computer program product. Therefore, this application may use a form of hardware-only embodiments, software-only embodiments, or embodiments combining software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of processes and/or blocks in the flowcharts and/or the block diagrams. These computer program instructions may be provided to a general-purpose computer, a special-purpose computer, an embedded processor, or a processor of another programmable data processing device to generate a machine, so that the instructions executed by the computer or the processor of the other programmable data processing device generate an apparatus for implementing a specific function in one or more processes in the flowcharts and/or in one or more blocks in the block diagrams.

These computer program instructions may alternatively be stored in a computer-readable memory that can direct a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some embodiments of this application have been described, a person skilled in the art can make changes and modifications to these embodiments once the person skilled in the art learns of the basic inventive concept. Therefore, the following claims are intended to be construed as to cover the preferred embodiments and all changes and modifications falling within the scope of this application.

Clearly, a person skilled in the art can make various modifications and variations to embodiments of this application without departing from the spirit and scope of embodiments of this application. This application is also intended to cover these modifications and variations to embodiments of this application provided that the modifications and variations fall within the scope of protection defined by the following claims and their equivalent technologies.

What is claimed is:

1. A method for measuring state information of an intermediate object, comprising:

sending, by a first device, a first message to a second device, wherein the first message indicates to the second device to hop to different channels at different times to send radio signals, frequency bandwidth ranges of any two channels do not completely overlap, a frequency bandwidth range of each channel is within a total frequency bandwidth range supported by the first device, and the first message comprises a channel hopping order, the channel hopping order indicating hopping orders for at least two channels;

separately receiving, by the first device, the radio signals that are sent by the second device successively on the different channels at the different times, wherein the radio signals sent by the second device reach the first device after being reflected by an intermediate object located between the first device and the second device; and measuring, by the first device, state information of the intermediate object based on physical characteristics of the different radio signals that are separately received;

wherein the first message further comprises a feedback mode, the feedback mode comprises a feedback type and a type of measurement data;

the feedback type comprises at least one of a timely feedback type or an aggregated feedback type, and the type of measurement data comprises raw measurement data and processed measurement data;

the timely feedback type is used to indicate the second device to feed back to the first device a physical characteristic of a radio signal received on a current channel before hopping to a next channel;

the aggregated feedback type is used to indicate the second device to feed back to the first device physical characteristics of radio signals received on the plurality of channels after completing all channel hopping based on the first message;

the raw measurement data is used to indicate the second device to feed back to the first device a raw physical characteristic of a radio signal received on a channel; and the processed measurement data is used to indicate the second device to process a physical characteristic of a radio signal received on a channel and feed back the processed physical characteristic to the first device.

2. The method according to claim 1, further comprising:

sending, by the first device, a second message to a third device, wherein the second message indicates to the third device to hop to the different channels at different times to send radio signals, and the second device and the third device hop to a same channel at different times;

separately receiving, by the first device, the radio signals that are sent by the third device successively on the different channels at the different times, wherein the radio signals sent by the third device reach the first device after being reflected by the intermediate object; and measuring, by the first device, the state information of the intermediate object based on physical characteristics of the separately received radio signals that are sent by the third device successively on the different channels at the different times and the separately received radio signals sent by the second device.

3. The method according to claim 2, wherein the sending, by the first device, the first message to the second device, and the sending, by the first device, the second message to the third device comprise:

sending, by the first device, a third message to the second device and the third device, wherein the third message comprises the first message and the second message.

4. The method according to claim 3, wherein the third message comprises a quantity of bytes occupied by a target wakeup time (TWT) parameter information field corresponding to the third device, and a quantity of bytes occupied by a TWT parameter information field corresponding to the second device.

5. The method according to claim 3, wherein the third message comprises at least one of: indication information indicating whether a plurality of devices are comprised, or indication information indicating a quantity of devices.

6. The method according to claim 1, wherein the first message comprises identifiers of a plurality of channels and a channel hopping start time corresponding to an identifier of each channel, identifiers of the plurality of channels are different from each other, and a plurality of channel hopping start times are different from each other.

7. The method according to claim 6, wherein the first message comprises at least two TWT parameter information fields, and each TWT parameter information field comprises an identifier of one channel and a channel hopping start time corresponding to the identifier of the channel.

8. The method according to claim 7, wherein the TWT parameter information field further comprises a field that indicates whether a parameter set follows the TWT parameter information field.

9. The method according to claim 1, wherein the first message further comprises a channel hopping start time and a channel hopping time interval.

10. The method according to claim 1, wherein the first message further comprises a quantity of channel hopping repetitions, and the quantity of channel hopping repetitions indicates a quantity of executions that the channel hopping order is executed repeatedly by the second device.

11. The method according to claim 10, wherein the first message further comprises a channel hopping repetition time interval, the channel hopping repetition time interval indicates a time interval between an end time of executing the channel hopping order for the $n^{th}$ time by the second device and a start time of executing the channel hopping order for the $(n+1)^{th}$ time by the second device, and n is an integer greater than or equal to 1.

12. An apparatus, comprising a memory and a processor, wherein the memory stores executable instructions that when executed by the processor, cause the apparatus to:

send a first message to a second device, wherein the first message indicates to the second device to hop to different channels at different times to send radio signals, frequency bandwidth ranges of any two channels do not completely overlap, a frequency bandwidth range of each channel is within a total frequency bandwidth range supported by the apparatus, and the first message comprises a channel hopping order, the channel hopping order indicating hopping orders for at least two channels;

separately receive the radio signals that are sent by the second device successively on the different channels at the different times, wherein the radio signals sent by the second device are received by the apparatus after being reflected by an intermediate object located between the apparatus and the second device; and measure state information of the intermediate object based on physical characteristics of the radio signals that are separately received;

wherein the first message further comprises a feedback mode, the feedback mode comprises a feedback type and a type of measurement data;

the feedback type comprises at least one of a timely feedback type or an aggregated feedback type, and the type of measurement data comprises raw measurement data and processed measurement data;

the timely feedback type is used to indicate the second device to feed back to the apparatus a physical characteristic of a radio signal received on a current channel before hopping to a next channel;

the aggregated feedback type is used to indicate the second device to feed back to the apparatus physical characteristics of radio signals received on the plurality of channels after completing all channel hopping based on the first message;

the raw measurement data is used to indicate the second device to feed back to the apparatus a raw physical characteristic of a radio signal received on a channel; and the processed measurement data is used to indicate the second device to process a physical characteristic of a radio signal received on a channel and feed back the processed physical characteristic to the apparatus.

13. The apparatus according to claim 12, wherein when the executable instructions are executed by the processor, the executable instructions further cause the apparatus to:

send a second message to a third device, wherein the second message indicates to the third device to hop to the different channels at different times to send radio signals, and the second device and the third device hop to a same channel at different times;

separately receive the radio signals that are sent by the third device successively on the different channels at the different times, wherein the radio signals sent by the third device are received by the apparatus after being reflected by the intermediate object; and measure the state information of the intermediate object based on the physical characteristics of the separately received radio signals that are sent by the second device successively on the different channels at the different times, and physical characteristics of the separately received radio signals that are sent by the third device successively on the different channels at the different times.

14. The apparatus according to claim 13, wherein when the executable instructions are executed by the processor, the executable instructions further cause the apparatus to:

send a third message to the second device and the third device, wherein the third message comprises the first message and the second message.

15. The apparatus according to claim 14, wherein the third message comprises a quantity of bytes occupied by a target wakeup time (TWT) parameter information field corresponding to the third device, and a quantity of bytes occupied by a TWT parameter information field corresponding to the second device.

16. The apparatus according to claim 14, wherein the third message comprises at least one of: indication information indicating whether a plurality of devices are comprised, or indication information indicating a quantity of devices.

17. The apparatus according to claim 12, wherein the first message comprises identifiers of a plurality of channels and a channel hopping start time corresponding to an identifier of each channel, identifiers of different channels are different from each other, and a plurality of channel hopping start times are different from each other.

18. The apparatus according to claim 17, wherein the first message comprises at least two TWT parameter information fields, and each TWT parameter information field comprises an identifier of one channel and a channel hopping start time corresponding to the identifier of the channel.

19. The apparatus according to claim 18, wherein the TWT parameter information field further comprises a field indicating whether a parameter set follows the TWT parameter information field.

20. A non-transitory computer-readable storage medium, wherein the storage medium stores computer instructions, and when the computer instructions are executed by a computer, cause the computer to:

send a first message to a second device, wherein the first message is used to indicate to the second device to hop to different channels at different times to send radio signals, frequency bandwidth ranges of any two channels do not completely overlap, a frequency bandwidth range of each channel is within a total frequency bandwidth range supported by the apparatus, the first message comprises a channel hopping order, the channel hopping order indicating hopping orders for at least two channels;

separately receive the radio signals that are sent by the second device successively on the different channels at the different times, wherein the radio signals sent by the second device reach the apparatus after being reflected by an intermediate object located between the apparatus and the second device; and measure state information of the intermediate object based on physical characteristics of different radio signals that are separately received;

wherein the first message further comprises a feedback mode, the feedback mode comprises a feedback type and a type of measurement data;

the feedback type comprises at least one of a timely feedback type or an aggregated feedback type, and the type of measurement data comprises raw measurement data and processed measurement data;

the timely feedback type is used to indicate the second device to feed back to the computer a physical characteristic of a radio signal received on a current channel before hopping to a next channel;

the aggregated feedback type is used to indicate the second device to feed back to the computer physical characteristics of radio signals received on the plurality of channels after completing all channel hopping based on the first message;

the raw measurement data is used to indicate the second device to feed back to the computer a raw physical characteristic of a radio signal received on a channel; and the processed measurement data is used to indicate the second device to process a physical characteristic of a radio signal received on a channel and feed back the processed physical characteristic to the computer.

* * * * *